(12) United States Patent
Benosman et al.

(10) Patent No.: US 11,790,247 B2
(45) Date of Patent: Oct. 17, 2023

(54) ROBUST ADAPTIVE DYNAMIC MODE DECOMPOSITION FOR MODELING, PREDICTION, AND CONTROL OF HIGH DIMENSIONAL PHYSICAL SYSTEMS

(71) Applicant: Mitsubishi Electric Research Laboratories, Inc., Cambridge, MA (US)

(72) Inventors: Mouhacine Benosman, Boston, MA (US); Saleh Nabi, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 17/325,434

(22) Filed: May 20, 2021

(65) Prior Publication Data

US 2022/0374725 A1 Nov. 24, 2022

(51) Int. Cl.
*G06N 5/02* (2023.01)
*G05B 19/042* (2006.01)

(52) U.S. Cl.
CPC ............. *G06N 5/02* (2013.01); *G05B 19/042* (2013.01); *G05B 2219/24075* (2013.01); *G05B 2219/2614* (2013.01)

(58) Field of Classification Search
CPC .................. G06N 5/02; G05B 19/042; G05B 2219/24075; G05B 2219/2614
See application file for complete search history.

(56) References Cited

U.S. PATENT DOCUMENTS

| | | | |
|---|---|---|---|
| 2006/0122763 A1* | 6/2006 | Wang ................. | F02D 41/0057 701/103 |
| 2007/0001629 A1* | 1/2007 | McGarry .............. | B60L 3/102 318/52 |
| 2019/0293314 A1* | 9/2019 | Benosman ............. | F24F 11/83 |
| 2021/0146531 A1* | 5/2021 | Tremblay ............... | G06N 3/08 |

* cited by examiner

*Primary Examiner* — Michael W Choi
(74) *Attorney, Agent, or Firm* — Gene Vinokur; Hironori Tsukamoto

(57) ABSTRACT

A computer-implemented method is provided. The computer-implemented includes a data-driven model and a robust closure model stored in a memory by using a processor for controlling a system. The computer-implemented method includes steps of acquiring sensor signals from at least one sensor of the system via an interface, computing a state of the system based on the sensor signals, determining a gain of the robust closure model based on the state of the system, reproducing a state of the system based on the determined gain, estimating a physics-based model of the system by combining the data-driven model and the robust closure model, and generating control commands by mapping the state of the system using the estimated physics-based model.

10 Claims, 19 Drawing Sheets

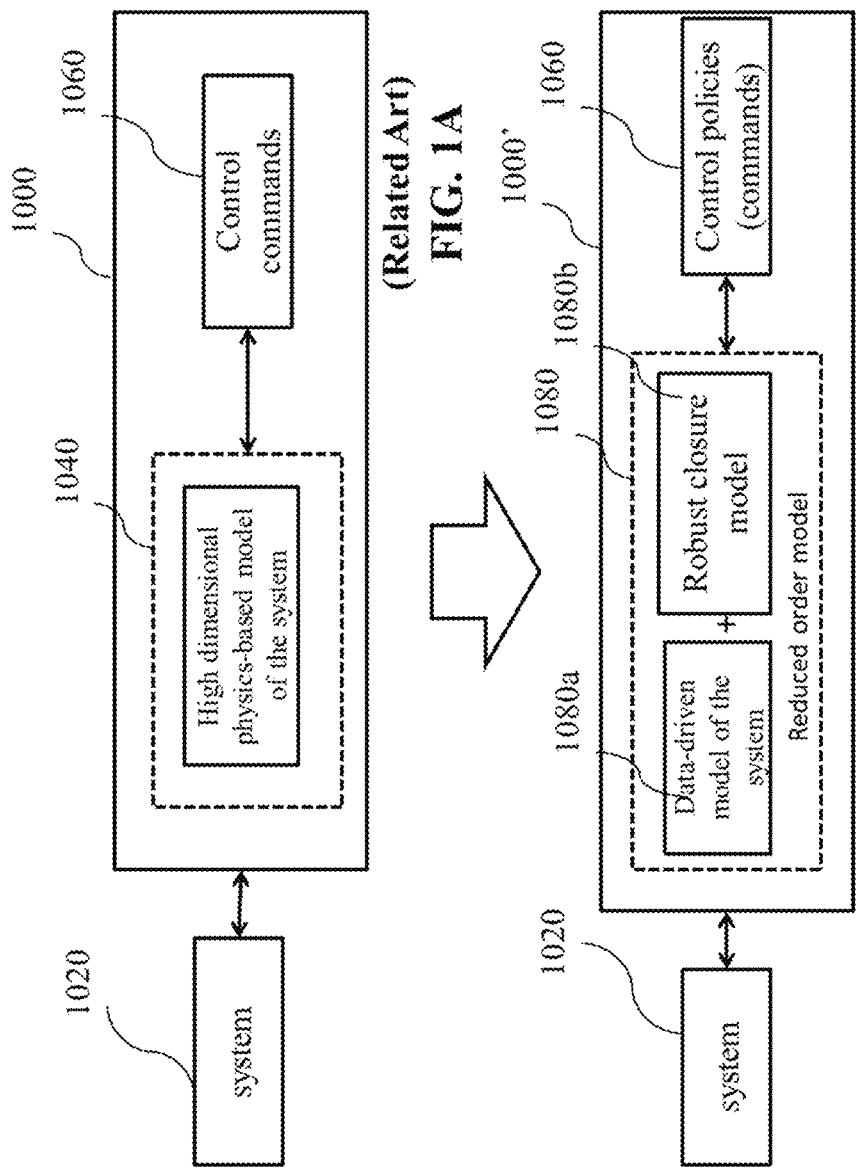

ROBUST ADAPTIVE DYNAMIC MODE DECOMPOSITION FOR MODELING, PREDICTION, AND CONTROL OF HIGH DIMENSIONAL PHYSICAL SYSTEMS

FIELD OF THE INVENTION

The present invention relates generally to system modeling, prediction and control. More particularly to methods and apparatus for robust data-driven model adaptation with dynamic mode decomposition to control a machine.

BACKGROUND OF THE INVENTION

Control theory in control systems engineering is a subfield of mathematics that deals with the control of continuously operating dynamical systems in engineered processes and machines. The objective is to develop a control policy for controlling such systems using a control action in an optimum manner without delay or overshoot and ensuring control stability.

For example, optimization-based control and estimation techniques, such as model predictive control (MPC), allow a model-based design framework in which the system dynamics and constraints can directly be taken into account. MPC is used in many applications to control dynamical systems of various complexities. Examples of such systems include production lines, car engines, robots, numerically controlled machining, motors, satellites and power generators. As used herein, a model of dynamics of a system or a model of a system describes dynamics of the system using differential equations.

However, in a number of situations, a model of a controlled system is nonlinear and can be difficult to design, to use in real-time, or can be just inaccurate. Examples of such cases are prevalent in robotics, building control (HVAC), smart grids, factory automation, transportation, self-tuning machines, and traffic networks.

In the absence of accurate models of dynamical systems, some control methods exploit operational data generated by these systems in order to construct models that help predict the behavior of the system over a given time-horizon, for example, in response to a control action. The use of data to design predictive models and control policies is called data-driven modeling and control.

The drawback of existing data-driven methods used to design a model for estimation and control is the lack of robustness to uncertainties in the system. Indeed, these uncertainties can come for several factors; for instance, again god the system can induce uncertainties not captured by the data collected to build the model. Furthermore, noisy measurements can also introduce uncertainties in the data-driven model.

There is need to overcome this important problem, we propose in this invention algorithms to robustify data-driven models based on dynamic mode decomposition (DMD), where the data is collected from a system by direct measurements. The obtained robust adaptive DMD (RA-DMD) models are then used for estimation, and control of the system.

SUMMARY OF THE INVENTION

It is an object of some embodiments to provide a system and a method for data-driven design of a model of dynamics of a system to generate a model of dynamics of a system that is robust to uncertainties of the system. In such a manner, the embodiments simplify model design process, while retaining advantages of having a model of the system in designing control applications. However, current data-driven methods are not suitable for estimating a model of the system that capture the uncertainties of a physical dynamics of the system.

For instance, problems in physics and engineering requiring the repeated simulation of partial differential equations (PDEs) with a large number of parameters are ubiquitous. Such problems appear in the fields of control, optimization, and uncertainty quantification, where solving PDE models are often too time-consuming. The use of reduced-order models (ROMs), i.e., reducing PDE model to a system of finite-dimensional ordinary differential equations (ODEs), in control and optimization has led to practical solutions for extremely challenging systems, such as control of thermo-fluidic systems, e.g. HVAC systems, and windfarms, among others.

The presence of increasingly large data sets, from experiments or simulations, enables the design of ROMs using methods like dynamic mode decomposition (DMD), which can extract tractable and physically relevant information from the data at a given set of the system's parameters. However, one major challenge is that ROMs can introduce stability loss and prediction degradation. These degradations are mainly due to the truncation of higher modes and parametric uncertainties. More specifically, the basis functions (spatial modes) obtained from data snapshots at one given set of parameters, may show deterioration in the accuracy of the ROMs prediction or even become unstable when applied to represent the solutions for a different range of parameters.

Accordingly, the present invention can provide the design of stable reduced-order models (ROMs) for partial differential equations (PDEs) with parametric uncertainties. More specifically, some embodiments focus here on using dynamic mode decomposition (DMD) to reduce a PDE to a DMD-ROM and then pose the ROM stabilization or closure problem in the framework of nonlinear robust control. Using this robust control framework, we design two DMD-ROM closure models that are robust to parametric uncertainties and truncation of modes. We finally add an adaptation layer to our framework, where we tune the closure models in real-time, using data-driven extremum seeking controllers.

This invention solves such issues, and relates to using data measurements to construct a robust adaptive model, for large scale systems, e.g., airflow models with millions of states.

Some embodiments describe how to use dynamic mode decomposition (DMD) to construct an optimal approximation of large-scale models of systems. More specifically, some embodiments describe how to robustify the DMD method to design a robust adaptive DMD method (RA-DMD), which leads to a robust optimal model approximation of the large-scale model, even in the presence of uncertainties in the observed system.

According to some embodiments of the present invention, a computer-implemented method is provided. The computer-implemented method may include a data-driven model and a robust closure model stored in a memory by using a processor for controlling a system, comprising: acquiring sensor signals from at least one sensor of the system via an interface; computing a state of the system based on the sensor signals; determining a gain of the robust closure model based on the state of the system; reproducing a state of the system based on the determined gain; estimating a physics-based model of the system by combining the data-driven model and the robust closure model; and generating control commands based by mapping the state of the system using the estimated physics-based model.

Further, some embodiments of the present invention can provide a controller for controlling an operation of a system. In this case, the controller may include an input interface configured to receive a state trajectory of the system via a network; a memory configured to store a model of dynamics of the system including a combination of at least one dynamical mode decomposition-based data-driven model and a robust closure model; and a processor configured to: update the robust closure model using an optimization algorithm having a value function reducing a difference between a shape of the received state trajectory and a shape of state trajectory estimated using the model with the updated robust closure model; determine a control command based on the data-driven model with the updated robust closure model; and an output interface configured to transmit the control command to an actuator of the system to control the operation of the system.

BRIEF DESCRIPTION OF THE DRAWING

The accompanying drawings, which are included to provide a further understanding of the invention, illustrate embodiments of the invention and together with the description to explain the principle of the invention.

FIG. 1A shows a schematic overview of principles used by a related art for controlling an operation of a system;

FIG. 1A' shows a schematic overview of a novel principle for controlling an operation of a system, according to another embodiment of the present invention;

Figure 1B:
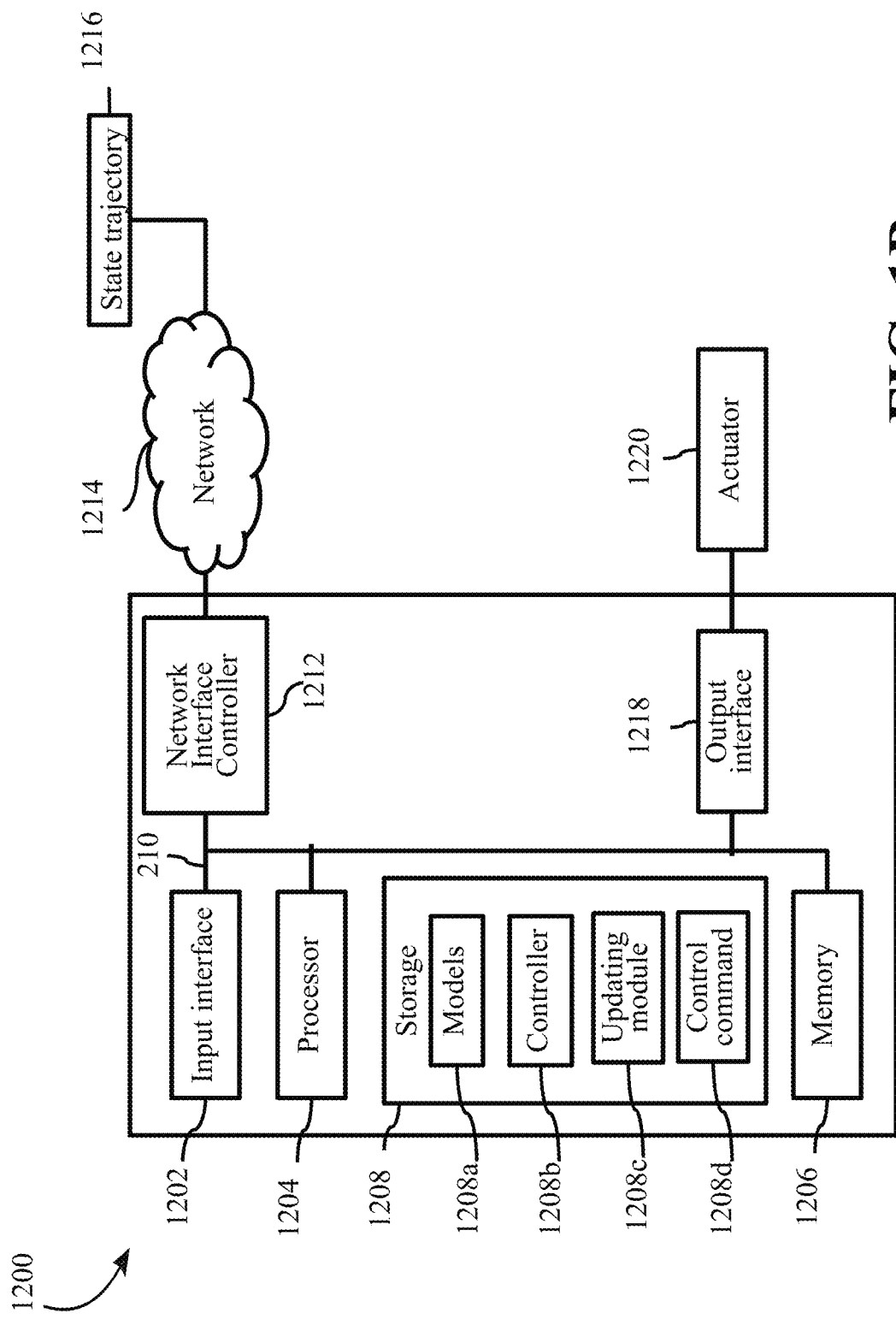
FIG. 1B shows a block diagram of an apparatus for controlling the operation of the system, according to some embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

In describing embodiments of the invention, the following definitions are applicable throughout the present disclosure.

A "control system" or a "controller" may be referred to a device or a set of devices to manage, command, direct or regulate the behavior of other devices or systems. The control system can be implemented by either software or hardware, and can include one or several modules. The control system, including feedback loops, can be implemented using a microprocessor. The control system can be an embedded system.

An "air-conditioning system" or a heating, ventilating, and air-conditioning (HVAC) system may be referred to a system that uses the vapor compression cycle to move refrigerant through components of the system based on principles of thermodynamics, fluid mechanics, and/or heat transfer. The air-conditioning systems span a very broad set of systems, ranging from systems which supply only outdoor air to the occupants of a building, to systems which only control the temperature of a building, to systems which control the temperature and humidity.

A "central processing unit (CPU)" or a "processor" may be referred to a computer or a component of a computer that reads and executes software instructions. Further, a processor can be "at least one processor" or "one or more than one processor"

A "module" or a "unit" may be referred to as a basic component in a computer that performs a task or part of a task. It can be implemented by either software or hardware.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

FIG. 1A shows a schematic overview of principles used by some embodiments for controlling an operation of a system. Some embodiments provide a control apparatus 1000 configured to control a system 1020. For example, the apparatus 1000 can be configured to control continuously operating dynamical system 1020 in engineered processes and machines. Hereinafter, "control apparatus" and "apparatus" may be used interchangeable and would mean the same. Hereinafter, "continuously operating dynamical system" and "system" may be used interchangeably and would mean the same. Examples of the system 1020 are HVAC systems, LIDAR systems, condensing units, production lines, self-tuning machines, smart grids, car engines, robots, numerically controlled machining, motors, satellites, power generators, traffic networks, and the like. Some embodiments are based on realization that the apparatus 1000 develops control commands 1060 for controlling the system 1020 using control actions in an optimum manner without delay or overshoot and ensuring control stability.

The control apparatus 1000 uses model-based control and prediction techniques, such as model predictive control (MPC), to develop the control commands 1060 for the system 1020. The model-based techniques can be advantageous for control of dynamic systems. For example, the MPC allows a model-based design framework in which the system 1020 dynamics and constraints can directly be taken into account. The MPC develops the control commands 1060, based on the model of the system 1040. The model 1040 of the system 102 refers to dynamics of the system 1020 described using dynamical systems equations, .e.g, partial differential equations (PDEs) or ordinary differential equations (ODEs). In some embodiments, the model 1040 is nonlinear high dimensional and can be difficult to use in real-time. For instance, even if the nonlinear model is exactly available, estimating the optimal control commands 1060 are essentially a challenging task since a partial differential equation (PDE) describing the dynamics of the system 1020, named Hamilton-Jacobi-Bellman (HJB) equation needs to be solved, which is computationally challenging.

FIG. 1A' shows a schematic overview of a novel principle for controlling an operation of a system according to another embodiment of the present invention.

The method illustrated in FIG. 1A uses physics principle to design the model 1040. In contrast with such physics-based modeling approaches, some embodiments of the present invention can use operational data measured from sensors of the system 1020 to design a model, e.g., a model 1080a, of the control system and, then, to use the data-driven model 1080a to control the system using various model-based control methods.

It should be noted, that the objective of some embodiments is to determined actual model of the system from data, i.e., such a model that can be used to estimate behavior of the system. For example, it is an object of some embodiments to determine the model of a system from data that capture dynamics of the system using differential equations. Additionally, it is an object of some embodiments to learn from data a robust model having similar accuracy as physics-based models.

To simplify the computation, some embodiments formulate an ordinary differential equation (ODE) $1080a$ to describe the dynamics of the system 1020. The ordinary differential equation (ODE) $1080a$ may be referred to as a data-driven model $1080a$ of a system. In some embodiments, the ODE $1080a$ may be formulated using dynamic mode decomposition (DMD) technique. However, in some cases, the ODE $1080a$ fails to reproduce actual dynamics (i.e. the dynamics described by the PDE) of the system 1020 in cases of uncertainty conditions. Examples of the uncertainty conditions may be the case where boundary conditions of the PDE are changing over a time or the case where one of coefficients involved in the PDE are changing, i.e., wear and tear of the system over time.

To that end, some embodiments formulate a closure model $1080b$ that robustifies the DMD data-driven model $1080a$, by covering the cases of the uncertainty conditions. In some embodiments, the closure model $1080b$ may be a nonlinear function of a state of the system 1020 capturing a difference in behavior (for instance, the dynamics) of the system 1020 according to the ODE. The closure model $1080b$ may be formulated using robust nonlinear control. In other words, the physics-based model of the system 1020 is approximated (estimated) by a combination of ODE 1080a and a robust closure model 1080b, and the robust closure model 108b is designed using nonlinear robust control methods. In such a manner, the model approaching the accuracy of physics-based model is learned from data in the form of DMD model 1080a robustified by a closure model 1080b.

To that end, some embodiments determine a gain and include the gain in the robust closure model 1080b to optimally reproduce the dynamics of the system 1020. In some embodiments, the gain may be adapted using optimization algorithms. The reduced order model 1080 comprising the ODE 1080a, the closure model 1080b with the adapted gain reproduces the dynamics of the system 1020. Therefore, the model 1080 optimally reproduces the dynamics of the system 1020. Some embodiments are based on realization that the model 1080 comprises less number of parameters than the physics-based high dimensional model. To that end, the reduced order model 1080 is computationally less complex than the model 1040 that describes the physical model of the system 1020. The control polices (commands) 1060 may be determined using the model 1080. The control policies 1060 directly map the states of the system 1020 to control (generate) commands to control the operations of the system 1020. Therefore, the reduced model 1080 is used to design control for the system 1020 in efficient manner.

FIG. 1B shows a block diagram of a control apparatus 1200 for controlling an operation of the system 1020, according to some embodiments. The apparatus 1200 includes an input interface 1202 and an output interface 1218 for connecting the apparatus 1200 with other systems and devices. In some embodiments, the apparatus 1200 may include a plurality of input interfaces and a plurality of output interfaces. The input interface 1202 is configured to receive a state trajectory 1216 of the system 1020. The input interface 202 includes a network interface controller (NIC) 1212 adapted to connect the apparatus 1200 through a bus 1210 to a network 1214. Through the network 1214, either wirelessly or through wires, the apparatus 1200 receives the state trajectory 1216 of the system 1020.

The state trajectory 1216 may be a plurality of states of the system 1020 that defines an actual behavior of dynamics of the system 1020. For instance, the state trajectory 1216 acts as a reference continuous state space for controlling the system 1020. In some embodiments, the state trajectory 1216 may be received from real-time measurements of parts of the system 1020 states.

The control apparatus 1200 further includes a processor 1204 and a memory 1206 that stores instructions that are executable by the processor 1204. The processor 1204 may be a single core processor, a multi-core processor, a computing cluster, or any number of other configurations. The memory 1206 may include random access memory (RAM), read only memory (ROM), flash memory, or any other suitable memory system. The processor 204 is connected through the bus 210 to one or more input and output devices. The stored instructions implement a method for controlling the operations of the system 1020.

The memory 1206 may be further extended to include storage 1208. The storage 1208 may be configured to store a model 1208a, a controller 1208b, an updating module 1208c, and a control command module 1208d. In some embodiments, the model 1208a may be the model describing the dynamics of the system 1020, which includes a combination of at least one differential equation and a robust closure model. The differential equation of the model 1208 may be the ordinary differential equation (ODE) 1080a. The closure model of model 1208a may be a linear function or a nonlinear function of the state of the system 1020. The robust closure model may be designed based on nonlinear robust control to mimic the behavior of the system 1020. As should be understood, once the robust closure model is learned the closure model may be the closure 1080b as illustrated in FIG. 1A.

The controller 1208b may be configured to store instructions upon execution by the processor 2104 executes one or more modules in the storage 1208. Some embodiments are based on realization that the controller 1208b administrates each module of the storage 1208 to control the system 1020.

Further, in some embodiments, the updating module 1208c may be configured to update a gain for the updated robust closure model. To that end, some embodiments determines the gain reducing an error between the state of the system 1020 estimated with the model 1208a having the updated closure model with the updated gain and an actual state of the system. In some embodiments, the actual state of the system may be a measured state. In some embodiments, the updating module 1208c may update the gain using an extremum seeking. In some other embodiments, the updating module 1208c may update the gain using a Gaussian process-based optimization.

The control command module 1208c may be configured to determine a control command based on the model 1208a with the updated robust closure model. The control command may control the operation of the system. In some embodiments, the operation of the system may be subject to constraints. To that end, the control command module 1208c uses a predictive model based control to determine the control command while enforcing constraints. The constraints include state constraints in continuous state space of the system 1020 and control input constraints in continuous control input space of the system 1020.

The output interface 1218 is configured to transmit the control command to an actuator 1220 of the system 1020 to control the operation of the system. Some examples of the output interface 1218 may include a control interface that submits the control command to control the system 1020.

Figure 1C:
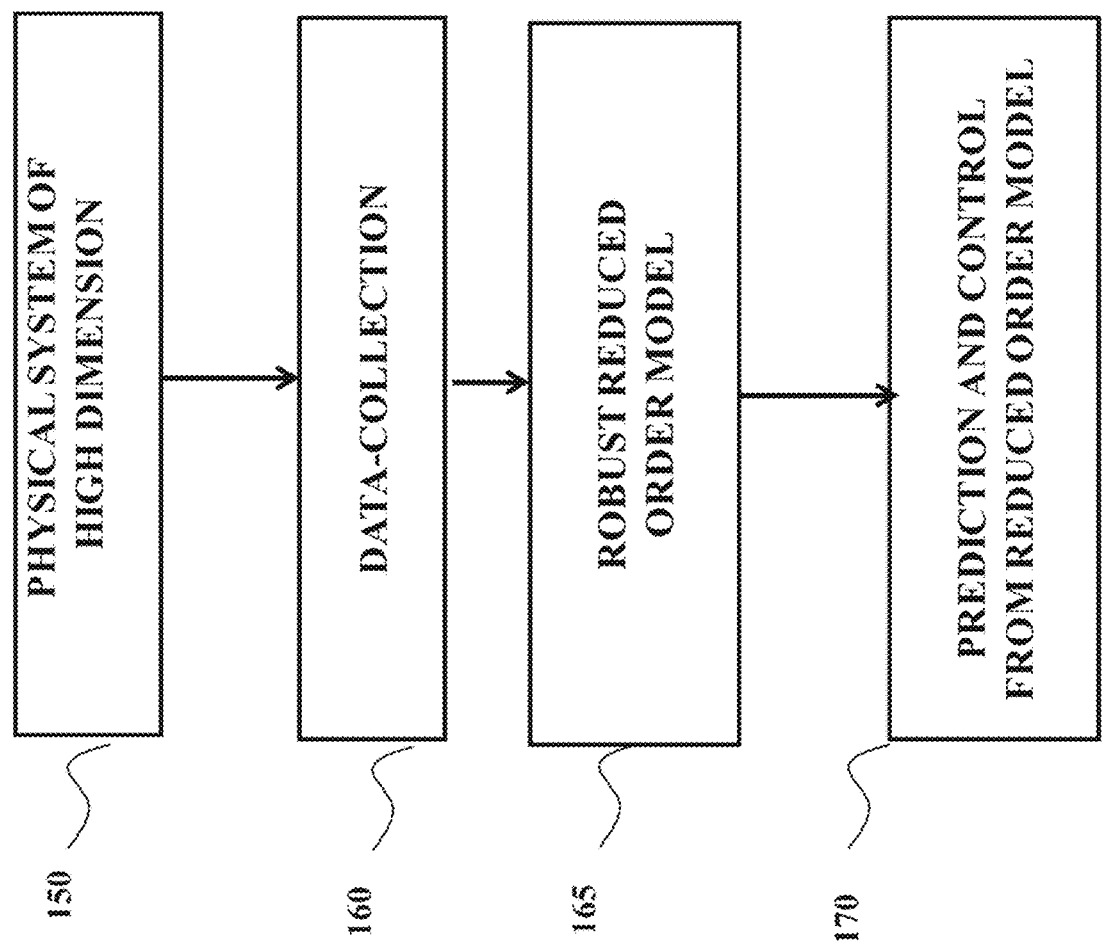
FIG. 1C is a schematic of relationship between high dimension system and robust model reduction in an embodiment of the invention.

For example in some embodiments of this invention, represented in FIG. 1C, we consider a system with high dimension 150, e.g. air conditioning system with million of states to represent the airflow and the temperature values distributed all over a room. We then place multiple sensors on the system to collect data 160, which is then used to generate a robust data-driven reduced order model (ROM) 165. This robust data-driven ROM is then used for prediction and control of the actual system 170.

Figure 2:
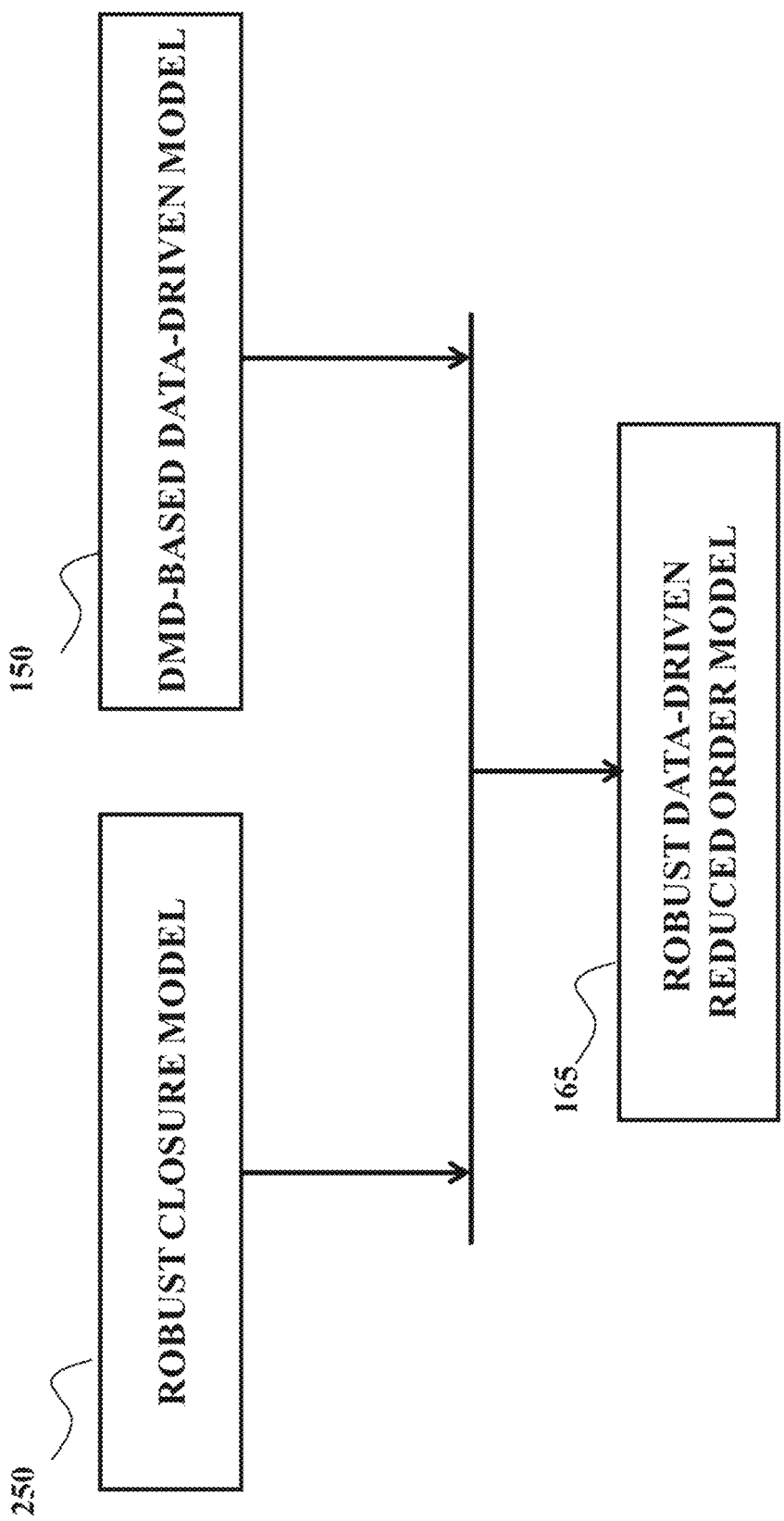
FIG. 2 is a schematic of a robust model reduction algorithm based on closure model and DMD-based model in an embodiment of the invention.

In some embodiments of this invention, represented in FIG. 2, the data-driven ROM 165, is obtained by using a dynamic mode decomposition (DMD) model 150, to which a robust closure model 250 is added to produce a robust DMD-based reduced order model 165.

Figure 3A:
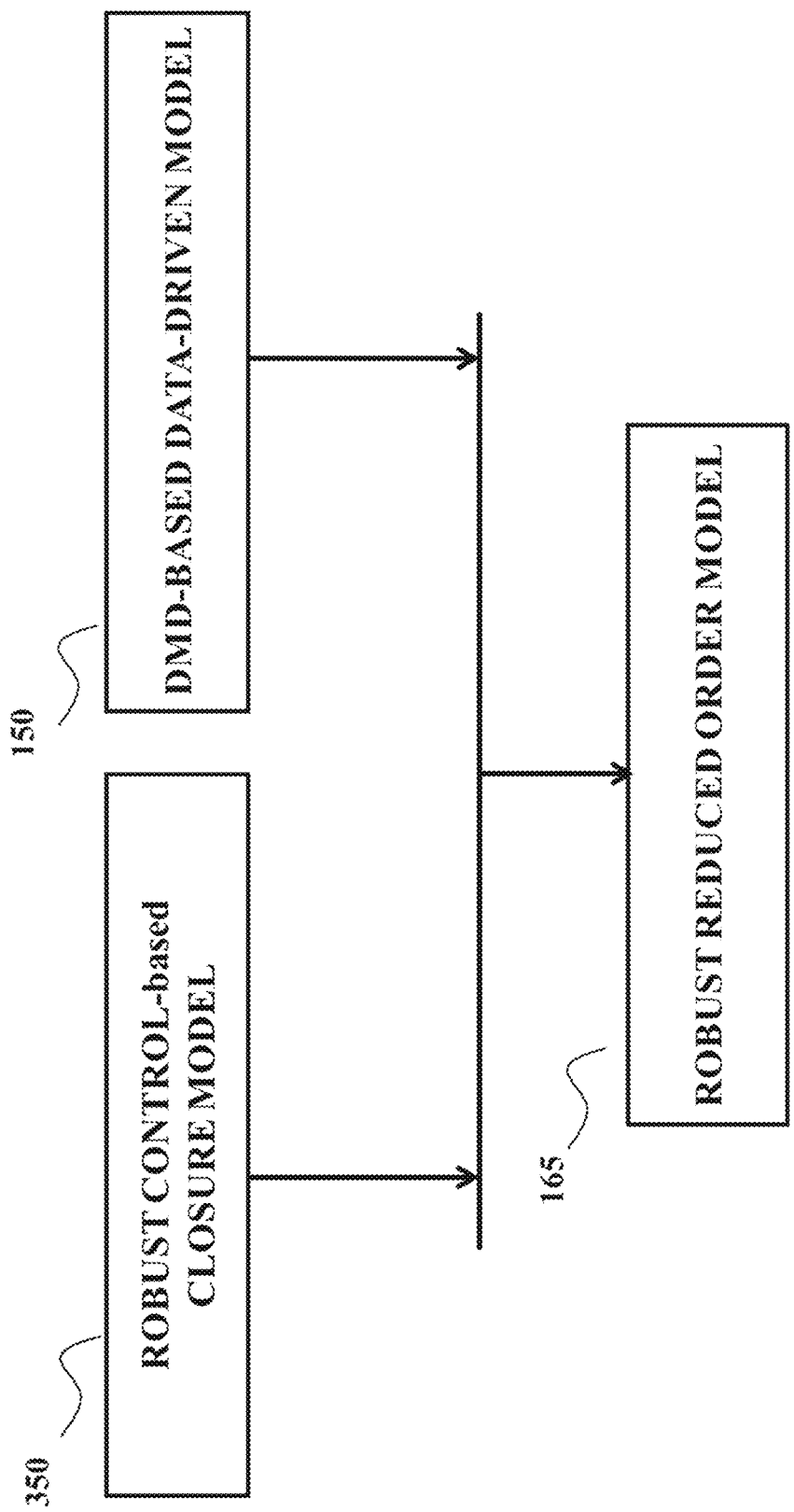
FIG. 3A is a schematic of a robust model reduction algorithm based on robust control-based closure model and DMD-based model in an embodiment of the invention.
Figure 3B:
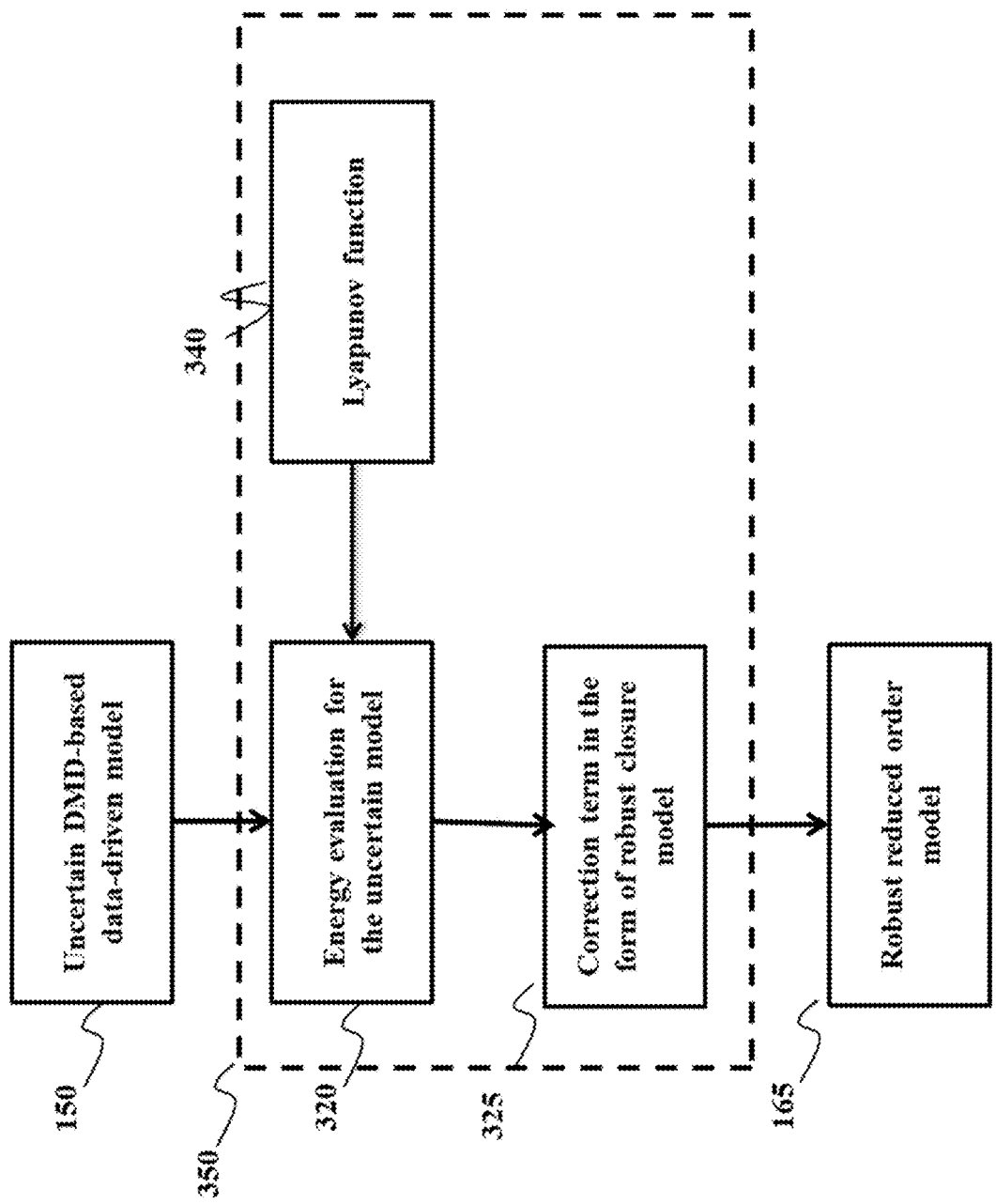
FIG. 3B is a schematic of a robust model reduction algorithm based on Lyapunov function according to an embodiment of an invention.

In some embodiments of this invention, represented in FIG. 3A, the robust closure model 250 is designed based on robust control methods 350. For example, in some embodiment, as in FIG. 3B, the uncertain DMD-based data driven model 150 is robustified 350, using a Lyapunov function 340, which is used to evaluate the energy of the uncertain model 320, and from this energy evaluation a correction term in the form of a closure model is obtained 325. Finally, the addition of the uncertain DMD-based model together with the robust closure model leads to a robust reduced order model 165.

Figure 4:
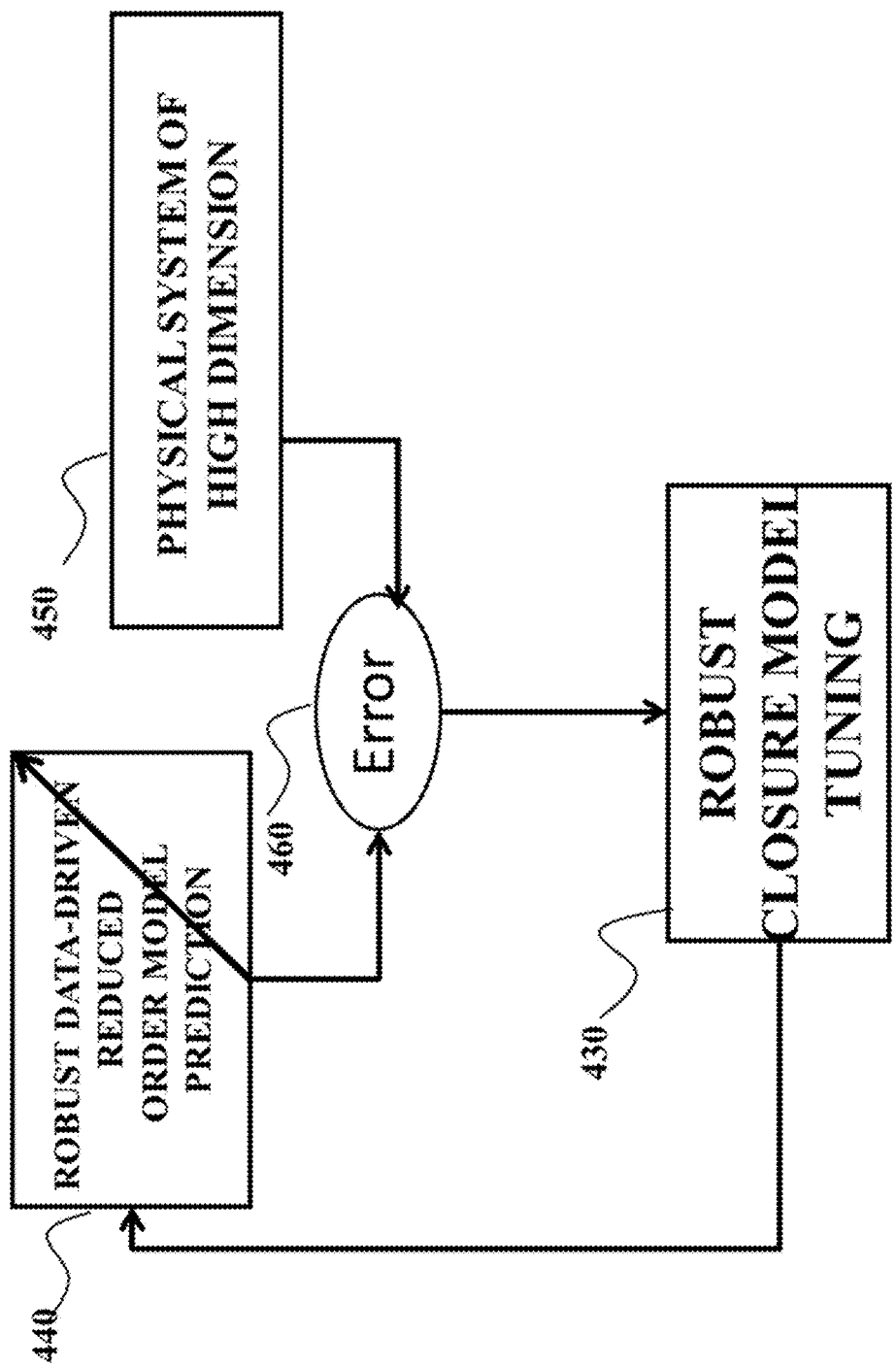
FIG. 4 is a schematic of a robust closure model tuning according to an embodiment of an invention.
Figure 5:
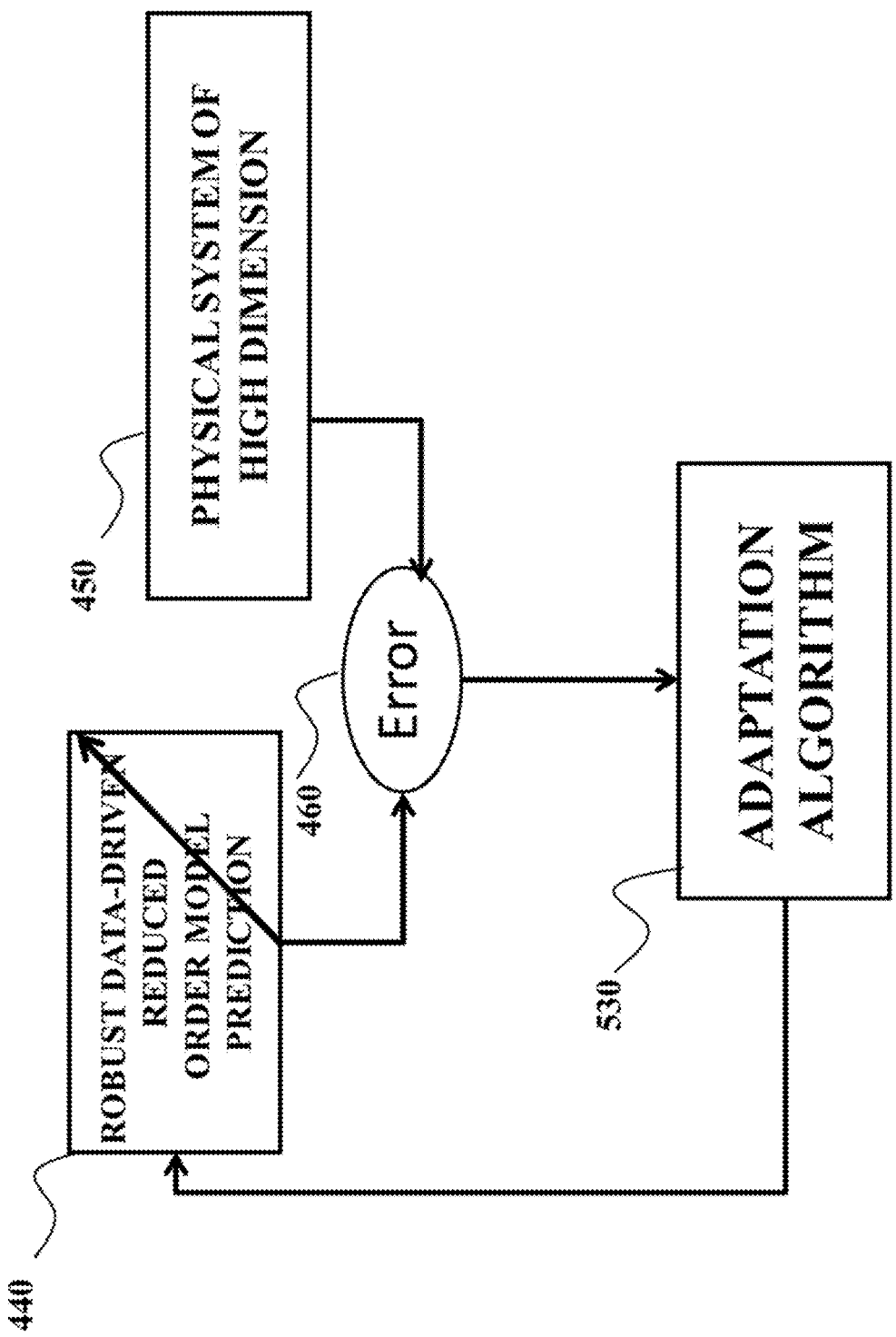
FIG. 5 is a schematic of a robust closure model adaptation algorithm according to an embodiment of an invention.
Figure 6:
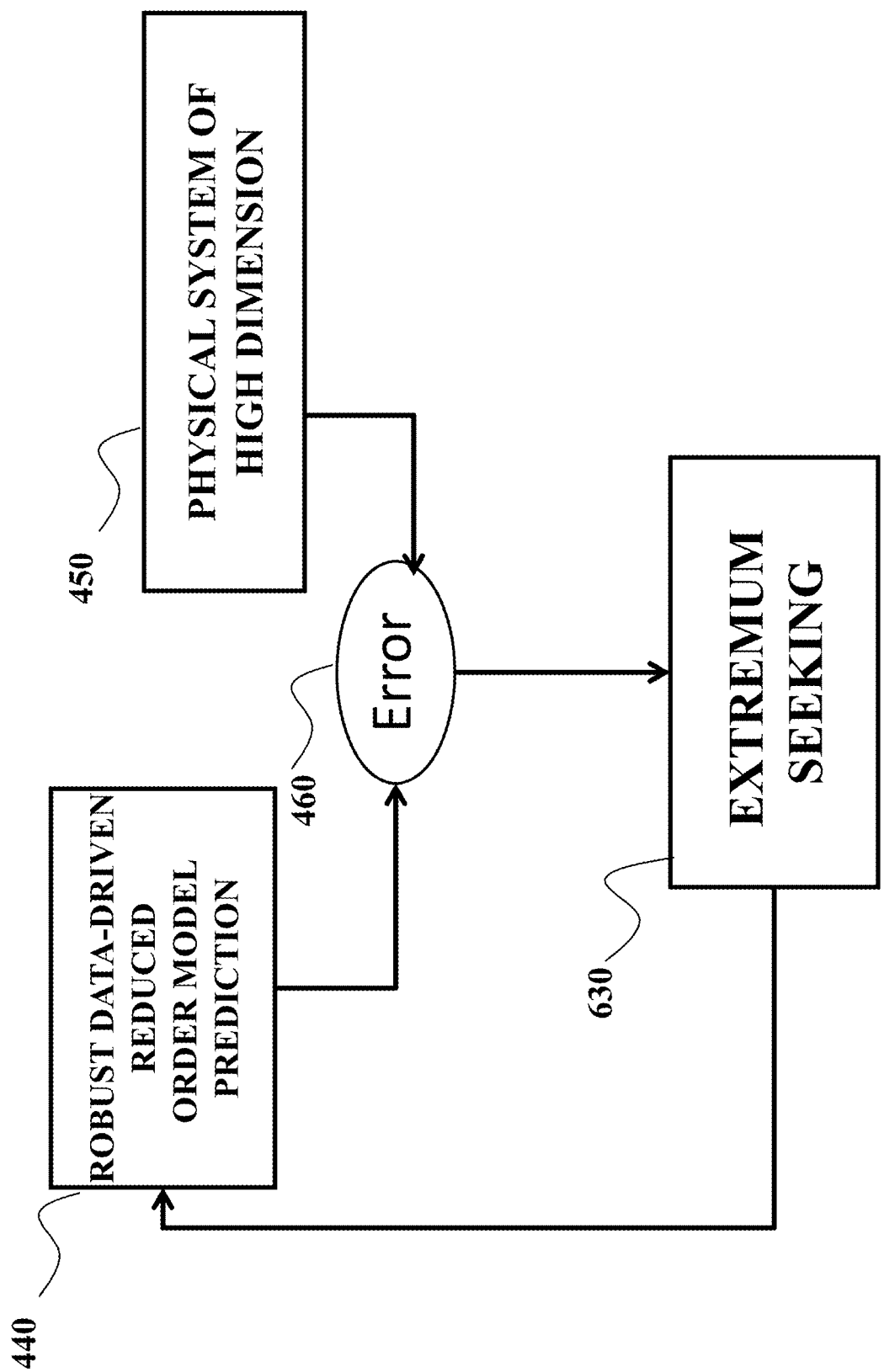
FIG. 6 is a schematic of an optimal extremum-seeking based robust model reduction according to an embodiment of an invention.
Figure 7A:
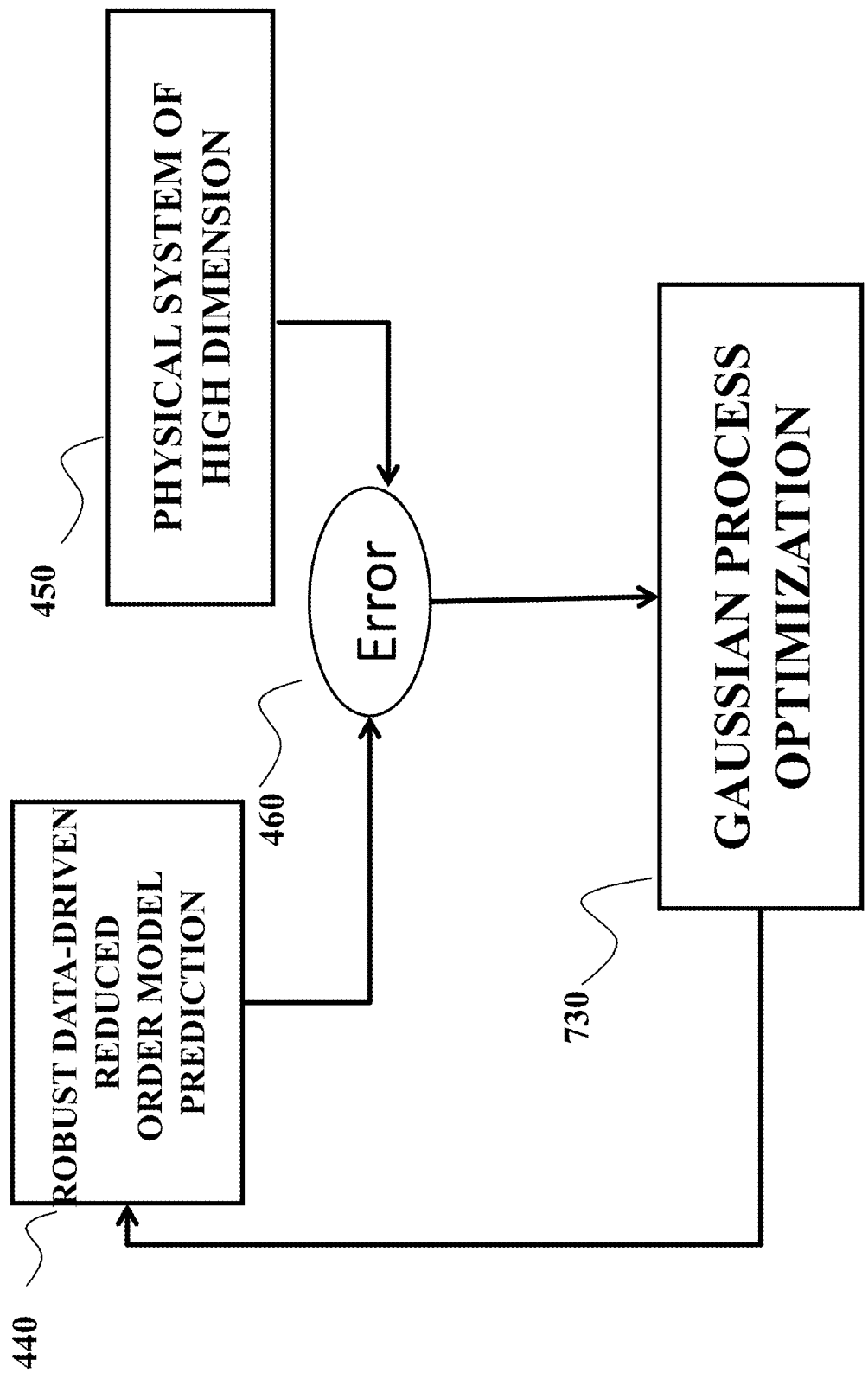
FIG. 7A is a schematic of an optimal Gaussian process based robust model reduction according to an embodiment of an invention.
Figure 7B:
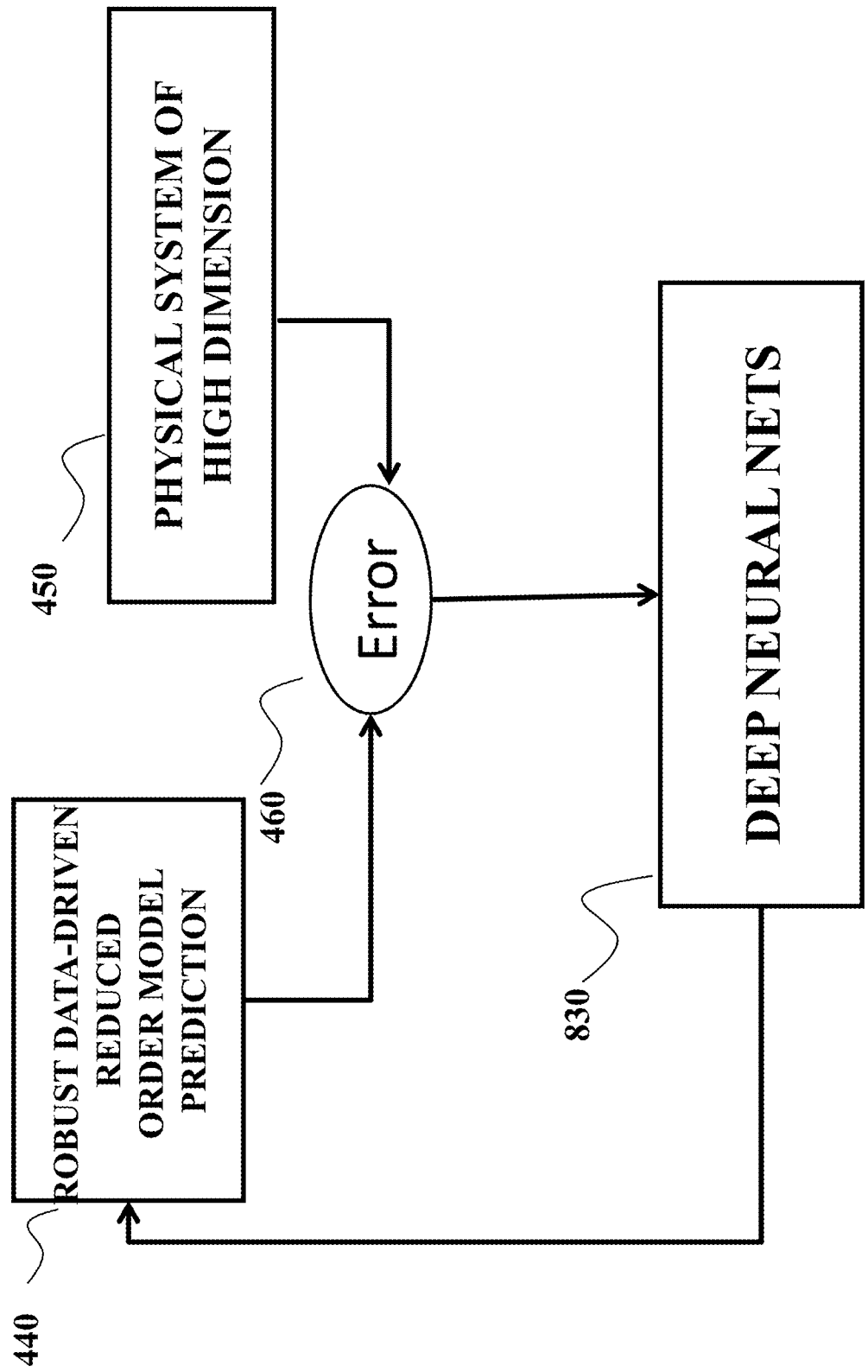
FIG. 7B is a schematic of a deep neural network learning process based robust model reduction according to an embodiment of an invention.
Figure 7C:
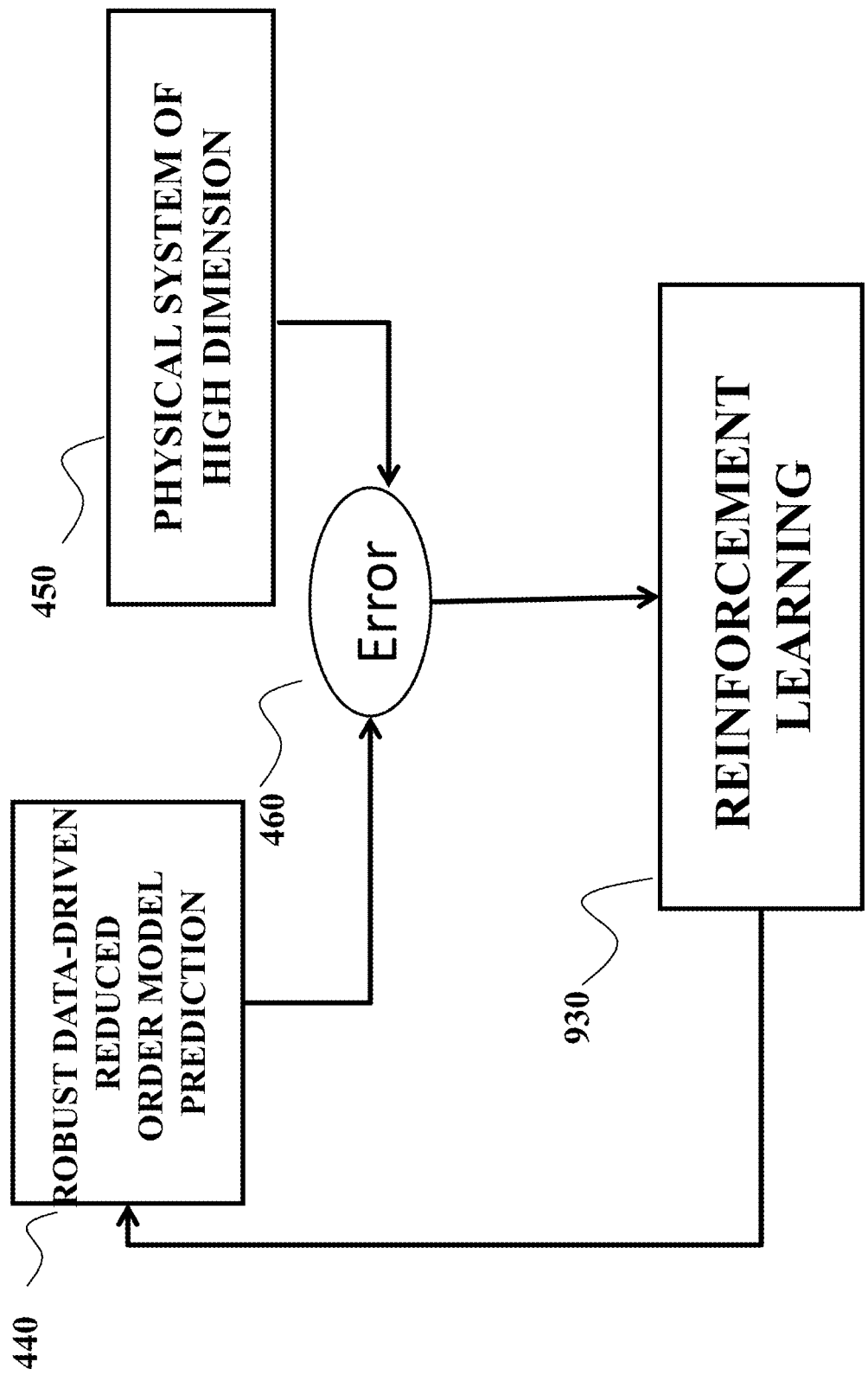
FIG. 7C is a schematic of a reinforcement learning process based robust model reduction according to an embodiment of an invention.

FIG. 4 is a schematic of a robust closure model tuning according to an embodiment of an invention. The other embodiments are also shown in FIGS. 5, 6, 7A, 7B and 7C. FIG. 5 is a schematic of a robust closure model adaptation algorithm;

FIG. 6 is a schematic of an optimal extremum-seeking based robust model reduction; FIG. 7A is a schematic of an optimal Gaussian process based robust model reduction; FIG. 7B is a schematic of a deep neural network learning process based robust model reduction; FIG. 7C is a schematic of a reinforcement learning process based robust model reduction.

The robust closure model 325 is further tuned 430 based on the difference 460 between measurements from the physical system 450, and predictions from the robust reduced order model 440. This tuning can be realized by the tuning of some parameters of the closure model, .e.g. tuning of basis functions' coefficients, or tuning of some physical coefficients appearing in the closure model, which can be implemented using an adaptation algorithm 530 (FIG. 5), wherein such adaptation algorithm can be in the form of an extremum seeking optimization algorithm 630 (FIG. 6), a bayesian optimization algorithm from the family of Gaussian process-based optimization 730 (FIG. 7A), deep neural networks 830 (FIG. 7C), or reinforcement learning methods 930 (FIG. 7C).

Figure 8:
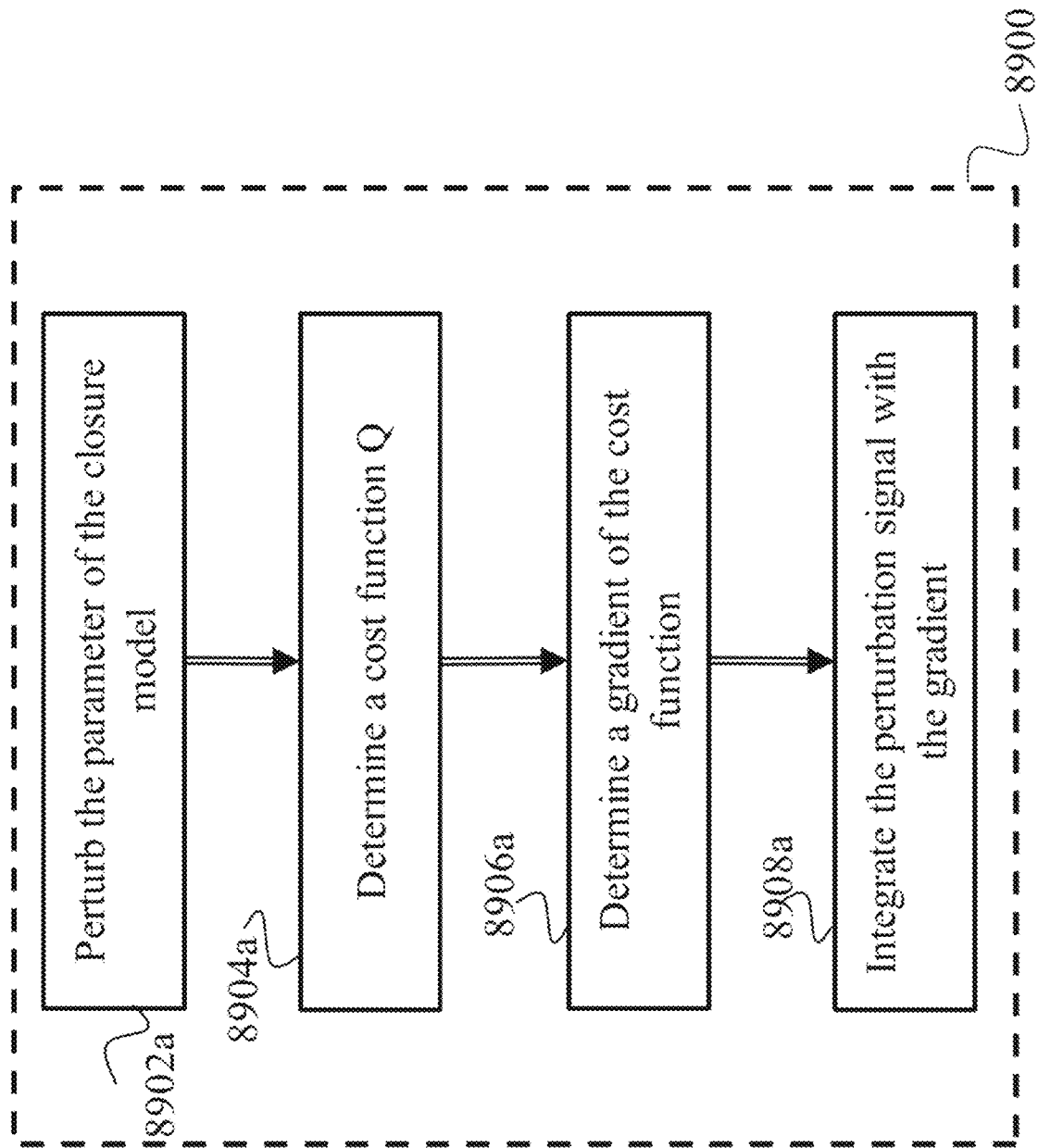
FIG. 8 is a flowchart of simplified ES, according to some embodiments of the present invention.

FIG. 8, shows a flowchart of an extremum seeking (ES) algorithm 8900 for updating the gain, according to some embodiments. Some embodiments are based on recognition that the ES algorithm 8900 is a model-free learning algorithm that allows the apparatus 1200 to tune the gain of the optimal closure model. Some embodiments are based on realization that the ES algorithm 8900 iteratively perturbs the gain of the optimal closure module with a perturbation signal until a termination condition is met. In some embodiments, the perturbation signal may be a periodic signal with a predetermined frequency. The gain of the optimal robust closure model may be a control parameter.

At step 8902*a*, the ES algorithm 8900 may perturb the control parameter of the optimal closure model. For instance, the ES algorithm 8900 may use the perturbation signal to perturb the control parameter. In some embodiments, the perturbation signal may be a previous updated perturbation signal. At step 8904*a*, the ES algorithm 8900 may determine the cost function Q for the closure model performance in response to perturbing the control parameter. At step 8906*a*, the ES may determine a gradient of the cost function by modifying the cost function with the perturbation signal. For instance, the gradient of the cost function is determined as a product of the cost function, the perturbation signal and a gain of the ES algorithm 8900. At step 8908*a*, the ES algorithm 8900 may integrate the perturbation signal with the determined gradient to update the perturbation signal for next iteration. The iteration of the ES 9800 can be repeated until the termination condition is met.

Figure 9:
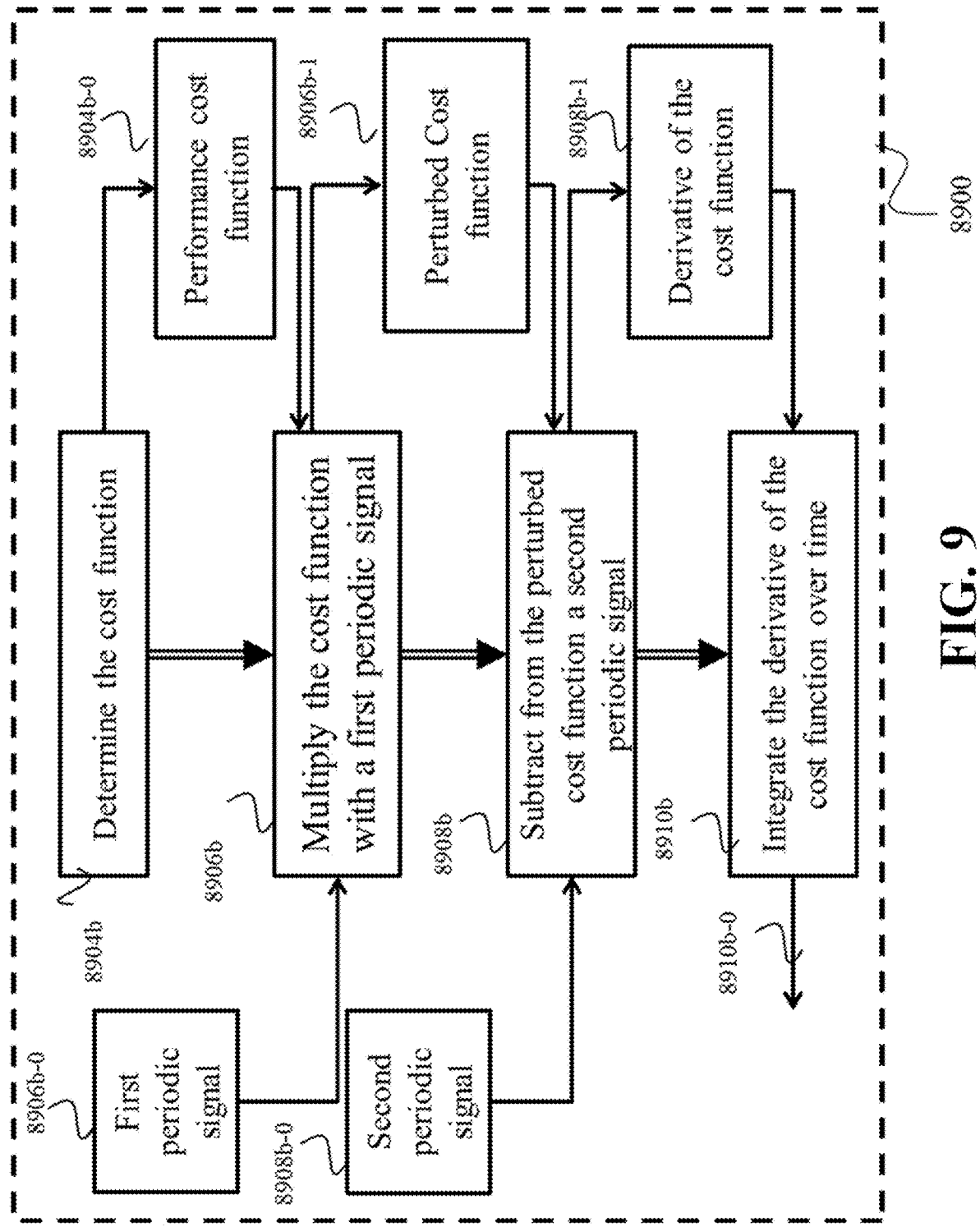
FIG. 9 is a detail flowchart of simplified ES, according to some embodiments of the present invention.

FIG. 9 shows a flowchart of extremum seeking (ES) algorithm 98900 that uses performance cost function for updating the gain, according to some embodiments. At step 98904*b*, the ES 98900 may determine the cost function for the closure model performance. In some embodiments, the ES algorithm 98900, at step 98904*b*, determines the cost function as exemplary illustrated in step 98904*a* of FIG. 8. In some embodiments, the determined cost function may be a performance cost function 98904*b*-0. According to some example embodiments, the performance cost function 98904*b*-0 may be a quadratic equation representing a behavior of the gap 460.

At step 98906*b*, the ES algorithm 98900 may multiply the determined cost function with a first periodic signal 89906*b*-0 of time to produce a perturbed cost function 98906*b*-1. At step 98908*b*, the ES algorithm 98900 may subtract from the perturbed cost function 98906*b*-1 a second periodic signal 98908*b*-0 having a ninety degree quadrature phase shift with respect to a phase of the first periodic signal 98906*b*-0 to produce a derivative of the cost function 98908*b*-1. At step 98910*b*, the ES algorithm 98900 may integrate the derivative of the cost function 98908*b*-1 over time to produce control parameter values 98910*b*-0 as a function of time.

Figure 10:
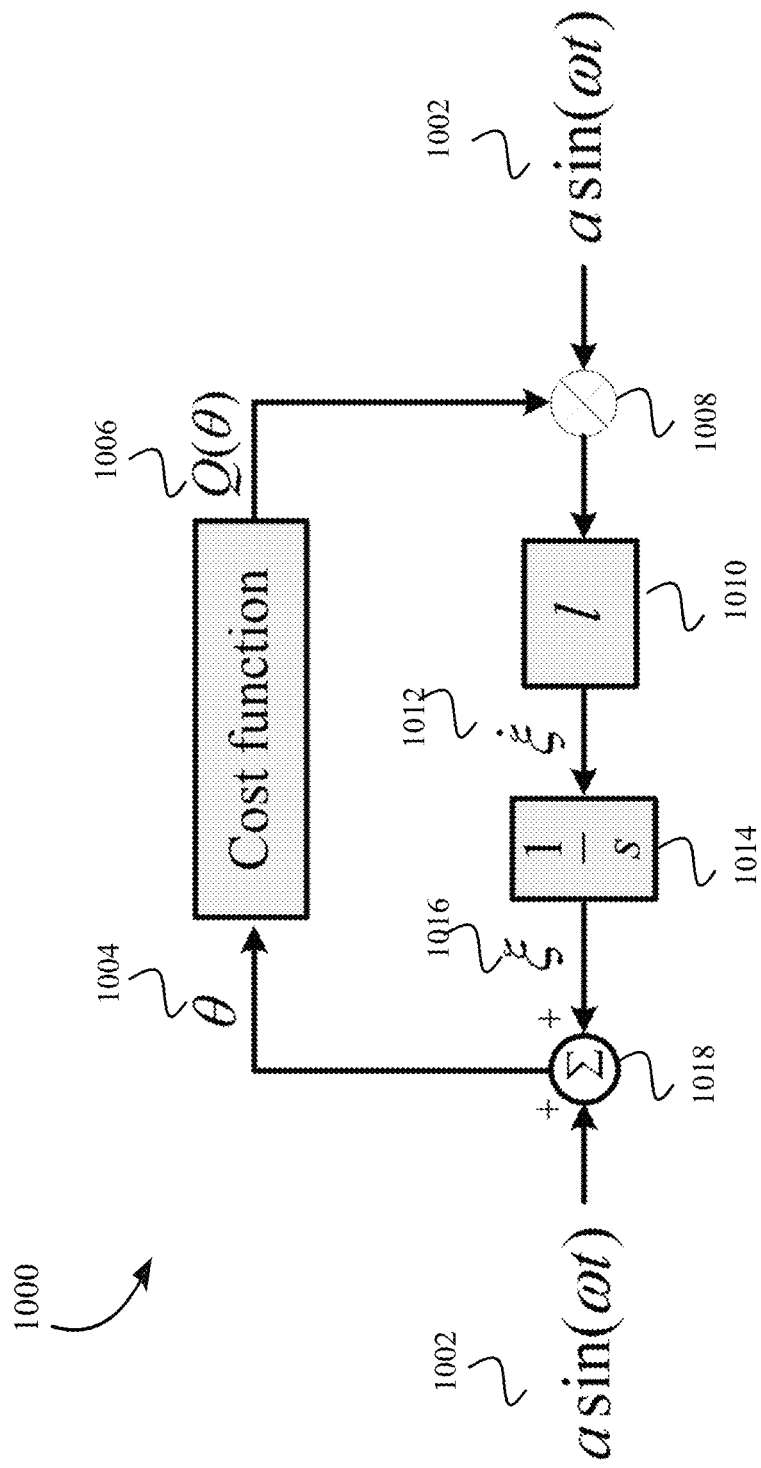
FIG. 10 shows Real time extremum seeking for one variable, according to some embodiments of the present invention.

FIG. 10 shows a schematic of an extremum seeking (ES) controller 1000 for single parameter tuning, according to some embodiments. The ES controller 1000 injects a sinusoidal perturbation signal a sin($\omega$t) 1002 to perturb a control parameter $\theta$ 1004. The ES controller 1000 determines the cost function Q($\theta$) 1006 for the closure model performance, in response to perturbing the control parameter $\theta$ 1004. The ES controller 1000 multiplies the determined cost function Q($\theta$) 1006 with the sinusoidal perturbation signal a sin($\omega$t) 1002 using a multiplier 1008. Further, the ES controller multiplies the resulting signal obtained from the multiplier 1008 with a gain l 1010 of the ES to form an estimate of the gradient $\dot{\xi}$ 1012 of the cost function Q($\theta$) 1006. The ES controller 1000 passes the estimated gradient $\dot{\xi}$ 1012 through an integrator 1/s 1014 to produce a parameter $\xi$ 1016. The parameter $\xi$ 1016 is added to the sinusoidal perturbation signal a sin($\omega$t) 1002 using a summer 1018 to modulate the sinusoidal perturbation signal a sin($\omega$t) 1002 for next iteration. The iteration of the ES controller 100 can be repeated until the termination condition is met.

Figure 11:
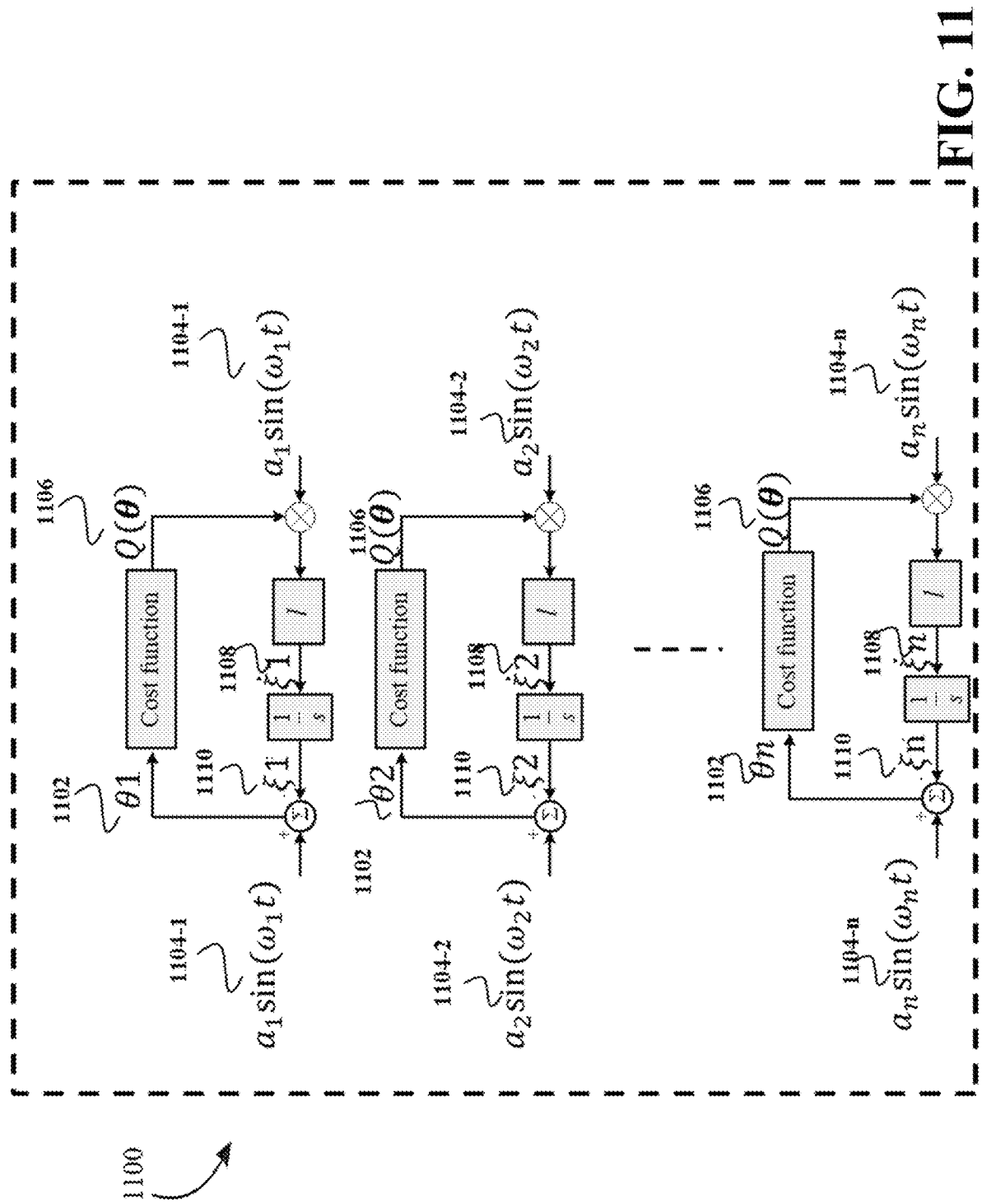
FIG. 11 shows Real time extremum seeking for multiple variables, according to some embodiments of the present invention.

FIG. 11 shows a schematic of an extremum seeking (ES) controller 1100 for multiple parameters tuning, according to some embodiments. Some embodiments are based on realization that the multi-parameter ES controller 1100 is derived from the single-parameter ES 1000. For instance, the single-parameter ES controller 1000 may be n times duplicated to obtain an n-parameter ES controller 1100. Some embodiments are based on recognition that the n-parameter ES controller 1100 perturbs a set of n control parameters $\theta_i$ 1102 with corresponding n perturbation signals 1104-1 to 1104-*n* having n different frequencies to update the optimal closure model. In some embodiments, each of the n different frequencies is greater than a frequency response of the system 102. In addition, the n different frequencies of the n perturbation signals 1104-1 to 1104-*n* satisfy a condition of convergence, such that a sum of a first frequency of a first perturbation signal 1104-1 and a second frequency of a second perturbation signal 1104-2 of the set is not equal to a third frequency of a third perturbation signal 1104-3.

Further, each of the n control parameter $\theta_i$ 1102 can be updated as explained in detail description of FIG. 10. To that end, the n-parameter ES controller 1100 comprises n control parameters $\theta_i$ 1102, n perturbation signals 1104-1 to 1104-*n*, n estimated gradients 1108 $\dot{\xi}_i$, n parameters $\xi_i$ 1110 and one common cost function Q($\theta$) 1106, which is function of all estimated control parameters $\theta=(\theta_1, \hat{a}$ 1102. In some embodiments, the multi-parameter ES 1100 may be mathematically defined as:

$$\dot{\xi}_i = a_i l \sin(\omega_i t) Q(\theta)$$

$$\theta_i = \xi_i + a_i \sin(\omega_i t)$$

where the perturbation frequencies $\omega_i$ are such that $\omega_i \neq \omega_j$, $\omega_i + \omega_j \neq \omega_k$, i, j, k $\in$ \{1, 2, $\hat{a}$, and $\omega_i > \omega^*$, with $\omega^*$ large enough to ensure the convergence. In some embodiments, when the parameters $a_i$, $\omega_i$, and l are properly selected, the cost function Q(theta) 1106 converges to a neighborhood of an optimal cost function $Q(\theta^*)$.

As should be understood, once the control parameter $\theta$ (i.e. the positive gain) is updated, using the ES algorithm or the Gaussian process-based optimization, in the optimal closure model, the optimal closure model in combination with ODE 406 mimics the actual behavior 602 of the system 1020. For instance, the estimated behavior 604 may be qualitatively and quantitatively similar to the actual behavior 602 without the gap 606.

To that end, the optimal reduced model 406 comprising the ODE and the optimal closure model with the updated gain may be used to determine the control command. In some embodiments, the optimal reduced model 406 comprising the ODE, the optimal closure model with the updated gain may develop the control policies 106 for the system 1020. The control policies 106 may directly map the state of the system 1020 to the states of the system 1020 to the control commands to control the operation of the system 1020. Examples of control command includes, in case the system 1020 being the HVAC system, position valves, speed of compressor, parameters of evaporator, and the like. Examples of control command includes, in case the system 1020 being a rotor, speed of the rotor, temperature of a motor, and the like. Further, the control command may be transmitted, via the output interface 218, to actuators of the system 1020 to control the system 1020.

Figure 12:
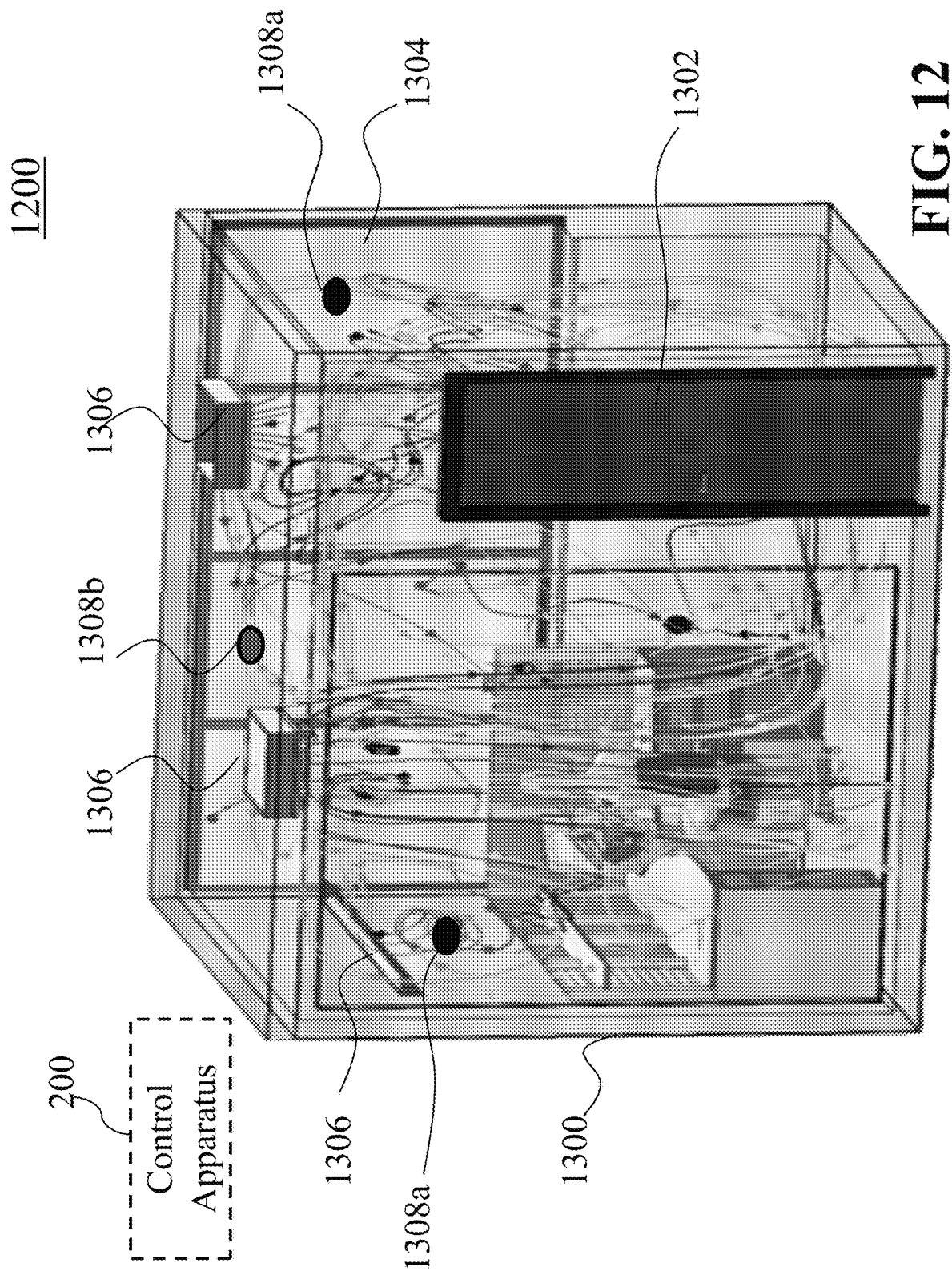
FIG. 12 shows an exemplary real-time implementation of the apparatus for controlling an air-conditioning system, according to some embodiments of the present invention.

FIG. 12 shows an exemplary real-time implementation of the apparatus 200 for controlling a system, wherein the system is an air-conditioning system 1200. In this example, the control apparatus 200 is configured to control the air-conditioning system 1200 arranged outside a room 1300, the room 1300 has a door 1302 and at least one window 1304. The states of the system may be the temperature and the airflow velocity of the room 1300, which are controlled by the apparatus 200 via an air-conditioning system 1200 through ventilation units 1306. A set of sensors 1308 is arranged in the room 1300, such as at least one airflow sensor 1308a for measuring velocity of the airflow at a given point in the room 1300, and at least one temperature sensor 1308b for measuring the room temperature. In this case the cost function Q can be given by the square of the difference between the measured signals from the temperature sensors and the airflow sensors and the signals of estimation of temperature values and airflow velocities values obtained from the reduced order model 1080. Other type of setting can be considered, for example a room with multiple HVAC units, or a house with multiple rooms.

Some embodiments are based on recognition that the air-conditioning system 1200 can be described by the physics-based model called the Boussinesq equation, as exemplary illustrated in FIG. 3. However, the Boussinesq equation contains infinite dimensions to resolve the Boussinesq equation for controlling the air-conditioning system 102. To that end, the model comprising the ODE 402 and the updated closure model with the updated gain is formulated as explained in detail description of FIGS. 1-11. The model reproduces the dynamics (for instance, an airflow dynamics) of the air-conditioning system 1200 in an optimal manner. Further, in some embodiments, the model of the airflow dynamics connects the values of the airflow (for instance, the velocity of the airflow) and the temperature of the air conditioned room 1300 during the operation of the air-conditioning system 1200. To that end, the control apparatus 200 optimally controls the air-conditioning system 1200 to generate the airflow in a conditioned manner.

Figure 13:
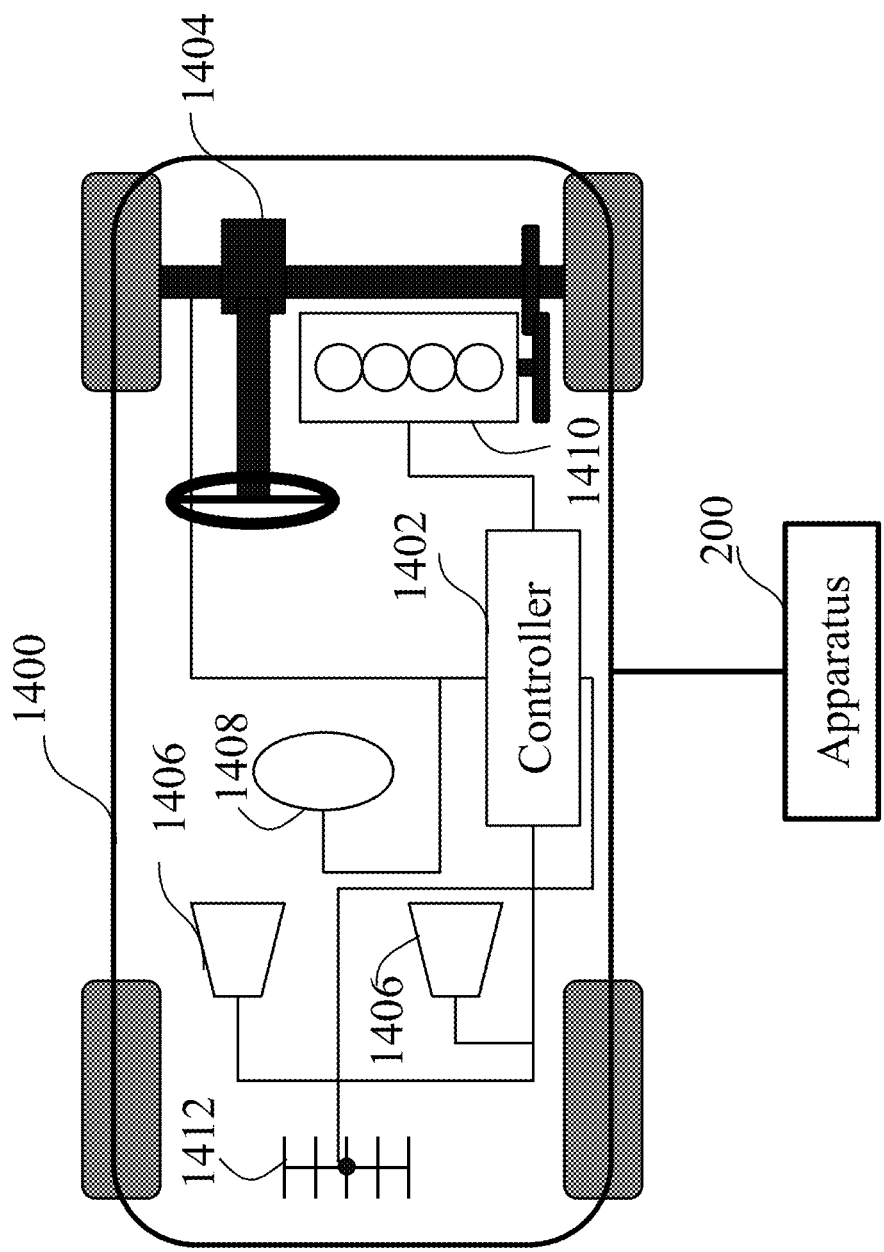
FIG. 13 shows an exemplary real-time implementation of the apparatus for controlling a vehicle, according to some embodiments of the present invention.

FIG. 13 shows an exemplary real-time implementation of the apparatus 200 for controlling the system of a vehicle, wherein the system is a vehicle (vehicle operation system) 1400. The vehicle 1400 may be any type of wheeled vehicle, such as a passenger car, bus, or rover. Also, the vehicle 1400 can be an autonomous or semi-autonomous vehicle. For example, some embodiments control the motion of the vehicle 1400. Examples of the system's states representing the motion include lateral motion of the vehicle controlled by a steering system 1404 of the vehicle 1400. In one embodiment, the steering system 1404 is controlled by the controller 1402. Additionally, or alternatively, the steering system 1404 may be controlled by a driver of the vehicle 1400.

In some embodiments, the vehicle may include an engine 1410, which can be controlled by the controller 1402 or by other components of the vehicle 1400. In some embodiments, the vehicle 1400 may include electric motors in place of the engine 1410 and can be controlled by the controller 1402 or by other components of the vehicle 1400. The vehicle can also include one or more sensors 1406 to sense the surrounding environment's states. Examples of the sensors 1406 include distance range finders, such as radars. In some embodiments, the vehicle 1400 includes one or more sensors 1408 to sense its current motion parameters and internal status. Examples of the one or more sensors 1408 include global positioning system (GPS), accelerometers, inertial measurement units, gyroscopes, shaft rotational sensors, torque sensors, deflection sensors, pressure sensor, and flow sensors. The sensors provide information to the controller 1402. The vehicle may be equipped with a transceiver 1412 enabling communication capabilities of the controller 1402 through wired or wireless communication channels with the apparatus 200 of some embodiments. For example, through the transceiver 1412, the controller 1402 receives the control commands from the apparatus 200. Further, the controller 1402 outputs the received control command to one or more actuators of the vehicle 1400, such as the steering wheel and/or the brakes of the vehicle, in order to control the motion of the vehicle. Further, the control apparatus 200 is configured to obtain/measure the states of the system (vehicle 1400) via the one or more sensors 1408 which are arranged to the parts on the vehicle 1400 including the steering system 1404, the controller 1402, and the engine 1410. The cost function Q in this case can be obtained by a square of the distance between the position and the velocity of the car as measured by the sensors, and the position and velocity of the car as obtained from the reduced order model of the system 1080.

Figure 14:
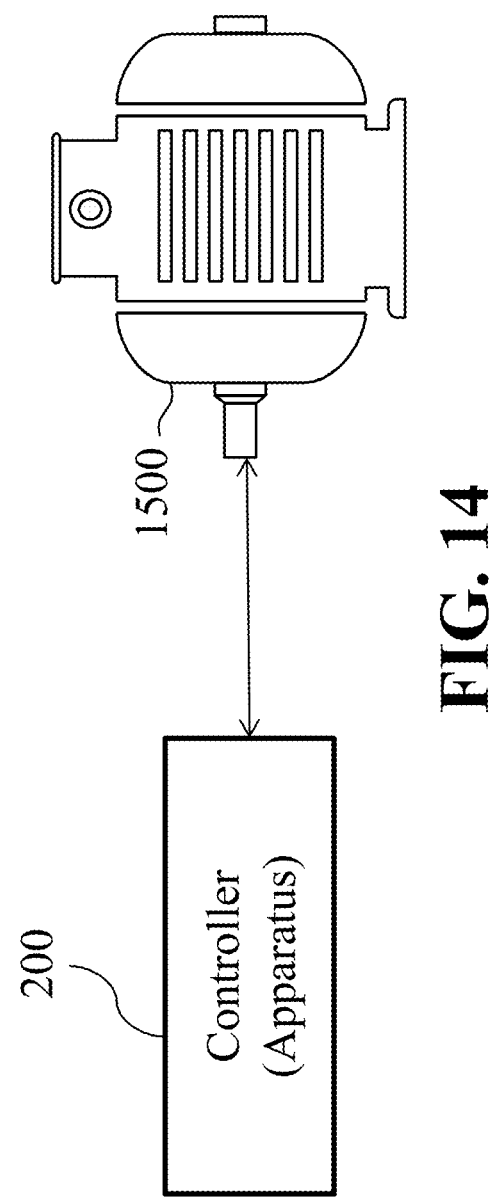
FIG. 14 shows an exemplary real-time implementation of the apparatus for controlling an induction motor (system), according to some embodiments of the present invention.

FIG. 14 shows an exemplary real-time implementation of the apparatus 200 for controlling the system 102, wherein the system 120 is an induction motor (induction motor system) 1500. In this example, the induction motor 1500 is integrated with the apparatus 200. The apparatus is configured to control the operation of the induction motor 1500 as explained in detail description of FIGS. 1-11. In some embodiments, the operation of the induction motor 1500 may be subjected to the constraints. The constraints include state constraints in continuous state space of the induction motor 1500 and control input constraints in continuous control input space of the induction motor 1500. In some embodiments, the state of the motor 1500 includes one or combination of a stator flux, a line current, and a rotor speed. The state constraints include constraints on values of one or combination of the stator flux, the line current, and the rotor speed. In some embodiments, the control inputs include values of an excitation voltage. The control input constraints include a constraint on the excitation voltage. The cost function Q in this case can be obtained by a square of the distance between the line current and the rotor speed of the motor as measured by the sensors, and the line current and the rotor speed as obtained from the reduced order model of the system 1080.

Example of Robust Data-Driven Modeling Using Dynamic Mode Decomposition

Let us now put the steps described above into a more mathematical setting. Indeed, we consider the state estimation problem for physical systems described by the exact high dimensional nonlinear PDE 210 systems of the form.

Dynamic mode decomposition (DMD) is a data-driven method to uncover the underlying dynamics of a system from data. In this paper, we typically consider data collected from a dynamical system of the form $$\dot{z}(t) = F(z(t), v),\ z(0) \in Z,\qquad (1)$$

where Z is an infinite-dimensional Hilbert space, and where v represents a physical viscosity of the system modeled by (1). We formulate the following boundedness assumption on the solutions of (1).

Assumption 1 The solutions of the original PDE model (1) are assumed to be in $L^2([0, \infty); Z)$, $\forall v \in R$.

Solutions to the PDE model (1) can be approximated in a finite dimensional subspace $Z^n \subset Z$ through expensive numerical discretization, which can be impractical for real-time applications such as prediction and control. In many systems, including fluid flows, solutions of the PDE may be well-approximated using only a few basis functions. In this paper we use DMD to construct these model reduction basis functions.

DMD is a data-driven technique that has been widely used in the fluid dynamics community to extract spatio-temporal modes from complex and dynamically evolving data-sets. Hence, DMD can be thought of as a combination of POD with Fourier transformation in time. DMD operates on empirical snapshot data to extract rich dynamical information that can be used to extract underlying dynamics from data. We consider a time series of data, collected at various instances in time, where the time is presented by $t_k$, where k is the time index. The data at the $t_k$ and $t_{k+1}$ time instance are given by vector $x_k \in R^n$ and $x_{k+1} \in R^n$ both of which are subsets of $Z^n$.

Once we collect measurement data from the system, the time-series data is stored in a snapshot matrix $X = [x_1\ x_2\ \ldots\ x_{n-1}] \in R^{n \times m}$ and a time shifted snapshot matrix $Y = [x_2\ x_3\ \ldots\ x_m] \in R^{n \times m}$. From linear dynamical system theory, we know that a linear matrix $A_{orig} \in R^{n \times n}$ maps the state $x_k$ to $x_{k+1}$ thereby satisfying the matrix equation $Y = A_{orig}X$. The DMD determines the linear dynamical map A leveraging the economy singular value decomposition (SVD) of X. Specifically, if $X = U \Sigma V^*$, then a lower-dimensional proxy system $A = U^* A_{orig} U$ can be formed, where U contains the leading r left singular vectors of X and the reduced-rank linear operator is given by $$A = U^* Y V \Sigma^{-1},\qquad (2)$$

where, $A \in R^{r \times r}$ is the reduced-rank operator of $A_{orig}$. It should be noted that DMD minimizes the following approximation error $$Px_{k+1} - A_{orig} x_k P\qquad (3)$$

over all snapshots for $k = 1, \ldots, m$.

Example of Closure Models and Extremum Seeking Based Tuning

As explained in the previous section, the reduced-order model obtained by DMD can be represented by $$\dot{x} = Ax,\qquad (4)$$

where $A \in R^{r \times r}$ is the uncertain state matrix. Furthermore, to retain the physical nature of the diffusive PDE model under study here, we explicitly add a diffusive term to the ROM (4), as $$\dot{x} = Ax - v_1 Dx,\qquad (5)$$

where D>0 represents a constant viscosity damping matrix, and $v_1 > 0$ a viscosity gain which will be used later to auto-tune the reduced order model tracking performance. This explicit addition of diffusion terms in the ROM is common in ROMs literature.

In this work, to account for physical model parametric uncertainties which often occur in real-life applications, e.g., Reynolds number mismatch in wind-farm applications, Richardson number uncertainties in HVAC applications, as well as, uncertainties induced by modal or basis function truncation, we formulate the DMD-ROM construction as a robust control problem, as follows $$\dot{x} = (A_n + \Delta A)x - v_1(D_n + \Delta D)x + u,\qquad (6)$$

where, $D_n > 0$, $\Delta D > 0$, $A_n$ and the uncertainty terms $\Delta A$, $\Delta D$ satisfy the following assumptions.

Assumption 2 The nominal state matrix $A_n$ is stable, i.e., $\lambda(A_n) < 0$.

Assumption 3 The state matrix uncertainty term $\Delta A$ is bounded, such that $P\Delta AP_F \geq \overline{\Delta A}$.

Assumption 4 The viscosity damping matrix uncertainty term $\Delta D$ is bounded, such that $P \Delta D P_F \leq \overline{\Delta D}$.

The virtual control term u is added here to represent a general closure model term, added to stabilize the DMD-ROM model. The difference with existing physics based literature on closure models is that we are formulating the closure model problem, in this context of DMD-ROM, as a robust stabilization problem.

We propose two closure models which we call, robust correction and robust correction with vanishing viscosity, respectively. We introduce these closure models, analyze their stability and robustness using Lyapunov theory in the follow section.

Closure Models for DMD-ROM

Example of Closure Model 1-Robust Correction

First, we consider the nonlinear closure model $u = u_{cl}^1(x)$, such that:

$$\dot{x} = (A_n + \Delta A)x - v_1(D_n + \Delta D)x + u_{cl}^1(x)\qquad (7)$$

where, $$u_{cl}^1(x) = -v_2(\overline{\Delta A} PxP - v_1 \overline{\Delta D} PxP)D_r x,\ v_2 > 0.\qquad (8)$$

Example of Closure model 2—Robust correction with vanishing viscosity. In addition to the closure term shown in above, we add a time varying exponential decaying term to ensure faster convergence. The time varying closure model is given us:

$$\dot{x} = (A_n + \Delta A)x - v_1(D_n + \Delta D)x + u_{cl}^2(x)\qquad (9)$$

where, $$u_{cl}^2(x) = -v_2(\overline{\Delta A} + \overline{\Delta D})PxPD_r x - v_1 e^{-\alpha t} D_r x\qquad (10)$$

Example of Extremum seeking-based closure models adaptive tuning. Multi-parametric extremum seeking (MES)

is a model free control algorithm, often used to optimize a given performance cost without closed-form information on the cost. However, MES control can also be used for open-loop model parametric identification, and feedback gain tuning. We follow similar ideas here, and propose to use MES to auto-tune the closure models described in Eq. (7) and Eq. (9), by continually updating the parameter weights $v_1$ and $v_2$, from online measurements from the system.

In this section, we will briefly describe the MES algorithm used to update the closure model parameters $v_1$ and $v_2$, in an online setting. We first define a suitable learning cost function for the MES algorithm. The learning cost function is a positive definite function of the norm of error between the measured output of the full-order model (FOM) (real system), and the output from the DMD-ROM with corrections in Eq. (7), Eq. (9), respectively. Given the output y(t)=Cx(t), where C is the output matrix, and x(t) is the state of the system at time t. The cost function (J) is given as $$J(v_1,v_2)=\int_0^{t_f} Py(t)-y_{ROM}(t,v_1,v_2)P^2 dt. \quad (11)$$

Here, $t_f>0$ denotes the learning time horizon, $y_{ROM}$ corresponds to the output of the DMD-ROM with closure model. In this work the error is computed online using measurements from exact solutions of the PDE, however, the same error can be computed in real applications, by direct measurements of the system.

We list some classical assumptions on the learning cost functions, which are needed to ensure some MES convergence guarantees.

Assumption 5 The cost function J has a local minima at $v^{opt}=(v_1^{opt}, v_2^{opt})$.

Assumption 6 The cost function J is analytic and its variation with respect to the parameter $v=[v_1, v_2]$ is bounded in the neighborhood of the local minima $v^{opt}$.

For simplicity of the presentation we consider a simple dither-based MES algorithm, given by:

$$\dot{z}_1(t) = a_1 \sin\left(\omega_1 t + \frac{\pi}{2}\right) J \quad (12)$$

$$v_1 = z_1 + a_1 \sin\left(\omega_1 t - \frac{\pi}{2}\right) \quad (13)$$

$$\dot{z}_2(t) = a_2 \sin\left(\omega_2 t + \frac{\pi}{2}\right) J \quad (14)$$

$$v_2 = z_2 + a_2 \sin\left(\omega_2 t - \frac{\pi}{2}\right) \quad (15)$$

Individual embodiments above are described as a process which is depicted as a flowchart, a flow diagram, a data flow diagram, a structure diagram, or a block diagram. Although a flowchart shows the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc.

When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

We claim:

1. A controller for controlling an operation of a system, comprising:
    an input interface configured to receive a state trajectory of the system via a network;
    a memory configured to store a model of dynamics of the system including a combination of at least one dynamical mode decomposition-based data-driven model and a robust closure model;
    a processor configured to:
    update the robust closure model using an optimization algorithm having a value function reducing a difference between a shape of the received state trajectory and a shape of state trajectory estimated using the model with the updated robust closure model;
    determine a control command based on the data-driven model with the updated robust closure model; and
    an output interface configured to transmit the control command to an actuator of the system to control the operation of the system.

2. The controller of claim 1, wherein the network is a wired network or wireless network.

3. The controller of claim 1, wherein the at least one sensor is configured to measure the state trajectory of the system.

4. The controller of claim 1, wherein a number of parameters used in the at least one dynamical mode decomposition-based data-driven model and the robust closure model is less than a number of parameters used in a physics-based high dimensional model.

5. The controller of claim 1, wherein the robust closure model is designed based on nonlinear robust control methods.

6. The controller of claim 1, wherein the robust closure model is formulated based on boundary conditions of a partial differential equation (PDE), wherein the boundary conditions are changing over a time.

7. The controller of claim 1, wherein the robust closure model is represented by a linear function of the state of the system or a nonlinear function of the state of the system.

8. The controller of claim 1, wherein the system is an air-conditioning system.

9. The controller of claim 1, wherein the system is a vehicle operation system.

10. The controller of claim 1, wherein the system is an induction motor system.

* * * * *